US 12,525,453 B2

(12) United States Patent
Tanoue et al.

(10) Patent No.: US 12,525,453 B2
(45) Date of Patent: Jan. 13, 2026

(54) PROCESSING APPARATUS AND PROCESSING METHOD

(71) Applicant: Tokyo Electron Limited, Tokyo (JP)

(72) Inventors: Hayato Tanoue, Kumamoto (JP); Yohei Yamashita, Kumamoto (JP); Hirotoshi Mori, Kumamoto (JP)

(73) Assignee: Tokyo Electron Limited, Tokyo (JP)

( * ) Notice: Subject to any disclaimer, the term of this patent is extended or adjusted under 35 U.S.C. 154(b) by 898 days.

(21) Appl. No.: 17/594,456

(22) PCT Filed: Apr. 7, 2020

(86) PCT No.: PCT/JP2020/015686
§ 371 (c)(1),
(2) Date: Oct. 18, 2021

(87) PCT Pub. No.: WO2020/213478
PCT Pub. Date: Oct. 22, 2020

(65) Prior Publication Data
US 2022/0181157 A1    Jun. 9, 2022

(30) Foreign Application Priority Data

Apr. 19, 2019  (JP) ................................. 2019-080318
Jul. 18, 2019  (JP) ................................. 2019-132984

(51) Int. Cl.
*H01L 21/268* (2006.01)
*H01L 21/324* (2006.01)

(52) U.S. Cl.
CPC .......... *H01L 21/268* (2013.01); *H01L 21/324* (2013.01)

(58) Field of Classification Search
CPC . H01L 21/268; H01L 21/324; H01L 21/7806; B44C 1/228; B81C 99/008; B23K 26/53; B23K 26/57
See application file for complete search history.

(56) References Cited

U.S. PATENT DOCUMENTS 9,018,080 B2 *   4/2015  Furuta .................... H01L 21/78
                                                      438/785
2010/0304507 A1 * 12/2010 Bouchet ............... H01L 21/306
                                                      257/E21.53
(Continued)

FOREIGN PATENT DOCUMENTS

CN        112996628 A      6/2021
JP        9-216152 A       8/1997
(Continued)

OTHER PUBLICATIONS

International Search Report of PCT/JP2020/015686 dated Jun. 30, 2020.
(Continued)

*Primary Examiner* — Brook Kebede
(74) *Attorney, Agent, or Firm* — Shih IP Law Group, PLLC

(57) ABSTRACT

A processing apparatus configured to process a processing target object includes a modifying device configured to radiate laser light to an inside of the processing target object to form multiple modification layers along a plane direction; and a controller configured to control an operation of the modifying device at least. The controller controls the modifying device to form, in the forming of the modification layers, a first modification layer formation region in which cracks that develop from neighboring modification layers along the plane direction are not connected, and also controls the modifying device to form, in the forming of the modification layers, a second modification layer formation region in which cracks that develop from neighboring modification layers along the plane direction are connected.

31 Claims, 23 Drawing Sheets

(56) References Cited

U.S. PATENT DOCUMENTS

| | | | |
|---|---|---|---|
| 2011/0053384 A1* | 3/2011 | Koyama | H01L 21/268 |
| | | | 438/798 |
| 2015/0140785 A1 | 5/2015 | Kwak | |

FOREIGN PATENT DOCUMENTS

| | | |
|---|---|---|
| JP | 2004111606 A | 4/2004 |
| JP | 2006108532 A | 4/2006 |
| JP | 2009131942 A | 6/2009 |
| JP | 2009135342 A | 6/2009 |
| JP | 2011159798 A | 8/2011 |
| JP | 2012064667 A | 3/2012 |
| JP | 2012069736 A | 4/2012 |
| JP | 2013161820 A | 8/2013 |
| JP | 2014167966 A | 9/2014 |
| JP | 2015516672 A | 6/2015 |
| JP | 2016-111143 A | 6/2016 |
| JP | 2017024039 A | 2/2017 |
| JP | 2017071074 A | 4/2017 |
| JP | 2017191825 A | 10/2017 |
| JP | 2018043340 A | 3/2018 |
| JP | 2020069533 A | 5/2020 |
| KR | 2017067141 A * | 6/2017 ............ B23K 26/38 |
| WO | 2013126927 A2 | 8/2013 |

OTHER PUBLICATIONS

International Search Report of PCT/JP2019/028310 dated Oct. 8, 2019.

International Search Report of PCT/JP2019/008120 dated May 28, 2019.

* cited by examiner

PROCESSING APPARATUS AND PROCESSING METHOD

CROSS-REFERENCE TO RELATED APPLICATIONS

This Application is a U.S. national phase application under 35 U.S.C. § 371 of PCT Application No. PCT/JP2020/015686 filed on Apr. 7, 2020, which claims the benefit of Japanese Patent Application Nos. 2019-080318 and 2019-132984 filed on Apr. 19, 2019 and Jul. 18, 2019, respectively, the entire disclosures of which are incorporated herein by reference.

TECHNICAL FIELD

The various aspects and embodiments described herein pertain generally to a processing apparatus and a processing method.

BACKGROUND

Patent Document 1 discloses a method in which an internal modification layer is formed in a single crystalline substrate, and the substrate is cut using the internal modification layer as a starting point. According to Patent Document 1, the internal modification layer is formed by changing a single crystalline structure of the substrate into a polycrystalline structure while radiating laser light to an inside of the substrate. In addition, in the internal modification layer, adjacent processing traces are connected.

PRIOR ART DOCUMENT

Patent Document 1: Japanese Patent Laid-open Publication No. H2013-161820

DISCLOSURE OF THE INVENTION

Means for Solving the Problems

In an exemplary embodiment, a processing apparatus configured to process a processing target object includes a modifying device configured to radiate laser light to an inside of the processing target object to form multiple modification layers along a plane direction; and a controller configured to control an operation of the modifying device at least. The controller controls the modifying device to form, in the forming of the modification layers, a first modification layer formation region in which cracks that develop from neighboring modification layers along the plane direction are not connected, and also controls the modifying device to form, in the forming of the modification layers, a second modification layer formation region in which cracks that develop from neighboring modification layers along the plane direction are connected.

DETAILED DESCRIPTION

In a manufacturing process for a semiconductor device, a processing target wafer as a processing target object having a plurality of devices such as electronic circuits formed on a surface thereof is thinned.

Figure 1:
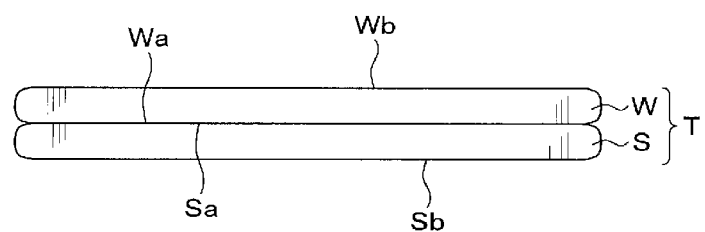
FIG. 1 is a side view schematically illustrating a structure of a combined wafer.

FIG. 1 is a side view schematically illustrating a structure of a combined wafer T formed by bonding a processing target wafer W and a support wafer S to each other. Hereinafter, in the processing target wafer W, a surface bonded to the support wafer S will be referred to as a front surface Wa, and a surface opposite to the front surface Wa will be referred to as a rear surface Wb. Likewise, in the support wafer S, a surface bonded to the processing target wafer W will be referred to as a front surface Sa, and a surface opposite to the front surface Sa will be referred to as a rear surface Sb.

The processing target wafer W is a semiconductor wafer such as, but not limited to, a silicon wafer having a circular plate shape, and it has, on the front surface Wa thereof, a device layer (not shown) including a plurality of devices such as electronic circuits. Further, an oxide film (not shown), for example, a $SiO_2$ film (TEOS film) is further formed on the device layer.

The support wafer S is a wafer that supports the processing target wafer W. An oxide film (not shown), for example, a $SiO_2$ film (TEOS film) is formed on the front surface Sa of the support wafer S. Further, if the support wafer S has a plurality of devices formed on the front surface Sa thereof, a device layer (not shown) is formed on the front surface Sa, the same as in the processing target wafer W.

Figure 2:
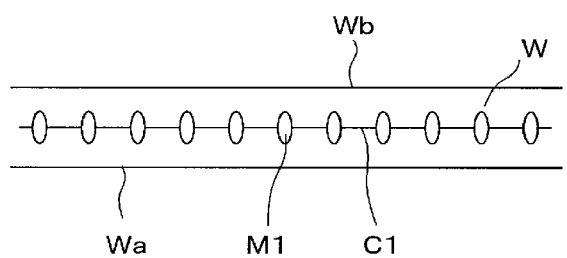
FIG. 2 is a cross sectional view illustrating a state in which an internal modification layer is formed in a processing target wafer.

A substrate inside processing apparatus described in the aforementioned Patent Document 1 is an apparatus for thinning a wafer. In this substrate inside processing apparatus, an internal modification layer M1 is formed by radiating laser light to an inside of the processing target wafer W, as shown in FIG. 2. Then, the processing target wafer W is thinned by being separated along the internal modification layer M1 and a crack (hereinafter, referred to as "crack C1") that develops from the internal modification layer M1. To separate the processing target wafer W, a tensile force in a separation direction is applied in the state that the front surface Wa side and the rear surface Wb side of the processing target wafer W are held.

However, when separating the processing target wafer W having the internal modification layer M1 formed therein by applying the tensile force in this way, the front surface Wa side and the rear surface Wb side of the processing target wafer W to be separated are still connected via the internal modification layer M1 even after the internal modification layer M1 is formed. For this reason, in order to separate the processing target wafer W, an excessive tensile force is required, and there is a room for improvement from this point of view.

The present disclosure provides a technique enabling to perform a thinning processing for a processing target object appropriately. Hereinafter, a wafer processing system equipped with a modifying apparatus as a processing apparatus configured to perform the thinning processing appropriately according to an exemplary embodiment, and a wafer processing method as a processing method will be described with reference to the accompanying drawings. In the present specification and the drawings, parts having substantially the same functions and configurations will be assigned same reference numerals, and redundant description thereof will be omitted.

Figure 3:
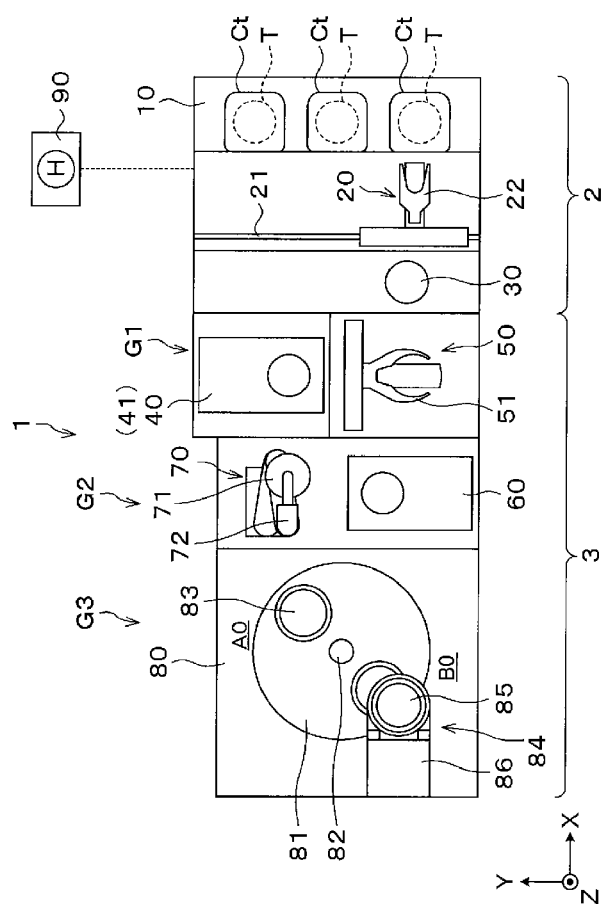
FIG. 3 is a plan view schematically illustrating a configuration of a wafer processing system.

First, a configuration of the wafer processing system will be discussed. FIG. 3 is a plan view schematically illustrating a configuration of a wafer processing system 1.

The wafer processing system 1 is configured to perform a processing on the combined wafer T in which the processing target wafer W and the support wafer S are bonded to each other as stated above. In the wafer processing system 1, the processing target wafer W is thinned. Further, in the present exemplary embodiment, the processing target wafer W corresponds to a processing target object of the present disclosure.

Figure 4:
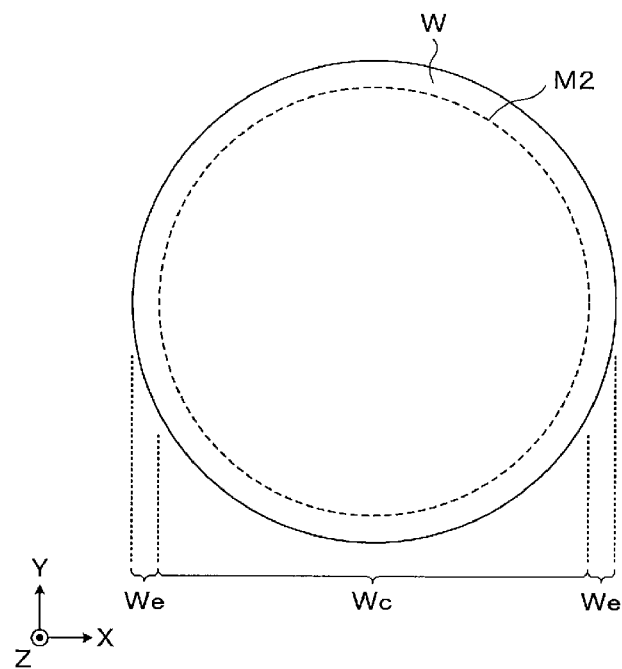
FIG. 4 is a cross sectional view illustrating a state in which a peripheral modification layer is formed in the processing target wafer.

Further, in addition to the above-stated thinning processing, an edge trimming processing is further performed on the processing target wafer W to suppress a peripheral portion of the processing target wafer W from having a sharp pointed shape (a so-called knife edge shape) by the thinning processing. In the edge trimming processing, as shown in FIG. 4, a peripheral modification layer M2 is formed by radiating laser light to a boundary between a peripheral portion We as a removing target and a central portion Wc, and the peripheral portion We is removed starting from this peripheral modification layer M2. Further, the peripheral portion We to be removed by the edge trimming may range from, e.g., 1 mm to 5 mm from an edge of the processing target wafer W in a diametrical direction thereof. A method of the edge trimming processing will be described later.

Figure 9:
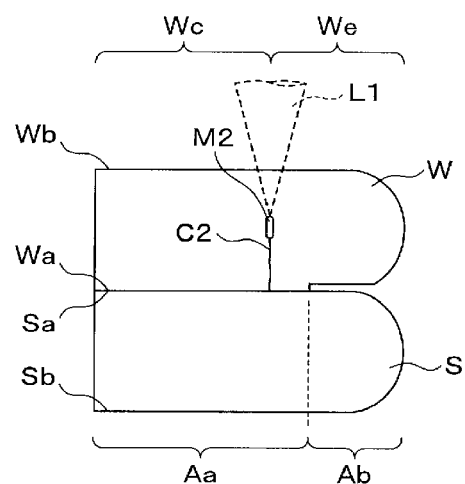
FIG. 9 is an explanatory diagram illustrating a state in which the peripheral modification layer is being formed in the processing target wafer.

Moreover, the processing target wafer W is provided with a bonding region Aa and a non-bonding region Ab for performing the edge trimming processing appropriately. To elaborate, as shown in FIG. 9 to be described later, the processing target wafer W and the support wafer S are bonded in the bonding region Aa, and a bonding strength between the processing target wafer W and the support wafer S are reduced in the non-bonding region Ab.

The non-bonding region Ab may be formed before the bonding, for example. Specifically, by removing a bonding interface of the processing target wafer W before being subjected to the bonding through polishing or wet etching, by modifying the bonding interface through radiation of laser light thereto, or by hydrophobizing the bonding interface through application of a hydrophobic material thereon, the bonding strength is reduced to form the non-bonding region Ab. Further, the "bonding interface" where the non-bonding region Ab is formed refers to a portion of the processing target wafer W forming an interface to be actually bonded to the support wafer S.

The non-bonding region Ab may be formed after the bonding, for example. Specifically, by radiating laser light to the interface in a portion corresponding to the peripheral portion We of the processing target wafer W after the bonding, the bonding strength for the front surface Sa of the support wafer S is reduced, so that the non-bonding region Ab is formed. In addition, the non-bonding region Ab may be formed at any position in the vicinity of the bonding interface between the processing target wafer W and the support wafer S as long as a bonding force between the processing target wafer W and the support wafer S in the peripheral portion of the processing target wafer W can be appropriately reduced. That is, it is assumed that the "vicinity of the bonding interface" according to the present exemplary embodiment includes the inside of the processing target wafer W, the inside of the device layer D, the inside of an oxide film Fw, and so forth.

As depicted in FIG. 3, the wafer processing system 1 includes a carry-in/out station 2 and a processing station 3 connected as one body. In the carry-in/out station 2, a cassette Ct capable of accommodating therein a multiple number of combined wafers T is carried to/from the outside, for example. The processing station 3 is equipped with various kinds of processing apparatuses configured to perform required processings on the combined wafers T.

A cassette placing table 10 is provided in the carry-in/out station 2. In the shown example, a plurality of, for example, three cassettes Ct can be arranged on the cassette placing table 10 in a row in the Y-axis direction. Further, the number of the cassettes Ct placed on the cassette placing table 10 is not limited to the example of the present exemplary embodiment but can be selected as required.

In the carry-in/out station 2, a wafer transfer device 20 is provided adjacent to the cassette placing table 10 at a negative X-axis side of the cassette placing table 10. The wafer transfer device 20 is configured to be movable on a transfer path 21 which is elongated in the Y-axis direction. Further, the wafer transfer device 20 is equipped with, for example, two transfer arms 22 each of which is configured to hold and transfer the combined wafer T. Each transfer arm 22 is configured to be movable in a horizontal direction and a vertical direction and pivotable around a horizontal axis and a vertical axis. Further, the configuration of the transfer arm 22 is not limited to the exemplary embodiment, and various other configurations may be adopted. The wafer transfer device 20 is configured to be capable of transferring the combined wafer T to/from the cassette Ct of the cassette placing table 10 and a transition device 30 to be described later.

In the carry-in/out station 2, the transition device 30 configured to deliver the combined wafer T is provided adjacent to the wafer transfer device 20 at a negative X-axis side of the wafer transfer device 20.

The processing station 3 is provided with, for example, three processing blocks G1 to G3. The first processing block G1, the second processing block G2 and the third processing block G3 are arranged side by side in this sequence from a positive X-axis side (from the carry-in/out station 2 side) toward a negative X-axis side.

The first processing block G1 is equipped with an etching apparatus 40, a cleaning apparatus 41, and a wafer transfer device 50. The etching apparatus 40 and the cleaning apparatus 41 are stacked on top of each other. Further, the number and the layout of the etching apparatus 40 and the cleaning apparatus 41 are not limited to the shown example. By way of example, the etching apparatus 40 and the cleaning apparatus 41 may be arranged side by side in the X-axis direction. Further, a plurality of etching apparatuses 40 and a plurality of cleaning apparatuses 41 may be respectively stacked on top of each other.

The etching apparatus 40 is configured to etch a separated surface of the processing target wafer W grounded by a processing apparatus 80 to be described later. By way of example, by supplying a chemical liquid (etching liquid) onto the separated surface, this separated surface is wet-etched. For instance, HF, $HNO_3$, $H_3PO_4$, TMAH, Choline, KOH, or the like may be used as the chemical liquid.

The cleaning apparatus 41 is configured to clean the separated surface of the processing target wafer W grounded by the processing apparatus 80 to be described later. By way of example, by bringing a brush into contact with the separated surface, the separated surface is cleaned by being scrubbed. Furthermore, a pressurized cleaning liquid may be used for the cleaning of the separated surface. In addition, the cleaning apparatus 41 may be configured to clean the rear surface Sb of the support wafer S as well as the separated surface of the processing target wafer W.

The wafer transfer device 50 is disposed at, for example, a negative Y-axis side of the etching apparatus 40 and the cleaning apparatus 41. The wafer transfer device 50 has, for example, two transfer arms 51 each of which is configured to hold and transfer the combined wafer T. Each transfer arm 51 is configured to be movable in a horizontal direction and a vertical direction and pivotable around a horizontal axis and a vertical axis. Further, the configuration of the transfer arm 51 is not limited to the exemplary embodiment, and various other configurations may be adopted. Additionally, the wafer transfer device 50 is configured to be capable of transferring the combined wafer T to/from the transition device 30, the etching apparatus 40, the cleaning apparatus 41 and a modifying apparatus 60 to be described later.

The second processing block G2 is equipped with the modifying apparatus 60 and a wafer transfer device 70. The number and the layout of the modifying apparatus 60 is not limited to the example of the present exemplary embodiment, and a plurality of modifying apparatuses 60 may be stacked.

The modifying apparatus 60 is configured to form the internal modification layer M1 and the peripheral modification layer M2 by radiating laser light to an inside of the processing target wafer W. A specific configuration of the modifying apparatus 60 will be elaborated later.

The wafer transfer device 70 is disposed at, for example, a positive Y-axis side of the modifying apparatus 60. The wafer transfer device 70 is equipped with, for example, two transfer arms 71 each of which is configured to hold and transfer the combined wafer T. Each transfer arm 71 is supported at a multi-joint arm member 72 and configured to be movable in a horizontal direction and a vertical direction and pivotable around a horizontal axis and a vertical axis. Further, the configuration of the transfer arm 71 is not limited to the example of the present exemplary embodiment, and may vary as required. The wafer transfer device 70 is configured to be capable of transferring the combined wafer T to/from the cleaning apparatus 41, the modifying apparatus 60, and the processing apparatus 80 to be described later.

The third processing block G3 is equipped with the processing apparatus 80. The number and the layout of the processing apparatus 80 is not limited to the example of the present exemplary embodiment, and a plurality of processing apparatuses 80 may be arranged as required.

The processing apparatus 80 has a rotary table 81. The rotary table 81 is configured to be rotatable about a vertical rotation center line 82 by a rotation mechanism (not shown). Two chucks 83 each configured to attract and hold the combined wafer T are provided on the rotary table 81. The chucks 83 are arranged on a circle concentric with the rotary table 81 in a uniform manner. The two chucks 83 are configured to be moved to a delivery position A0 and a processing position B0 as the rotary table 81 is rotated. Further, each of the two chucks 83 is configured to be rotatable around a vertical axis by a rotating mechanism (not shown).

At the delivery position A0, delivery of the combined wafer T is performed. The grinding unit 84 is disposed at the processing position B0 to grind the processing target wafer W. The grinding unit 84 is equipped with a grinder 85 having a grinding whetstone (not shown) configured to be rotated in a ring shape. Further, the grinder 85 is configured to be movable in a vertical direction along a supporting column 86. While keeping the processing target wafer W held by the chuck 83 in contact with the grinding whetstone, the chuck 83 and the grinding whetstone are respectively rotated.

The above-described wafer processing system 1 is equipped with a control device 90 as a controller. The control device 90 is implemented by, for example, a computer, and includes a program storage (not shown). A program for controlling a processing of the combined wafer T in the wafer processing system 1 is stored in the program storage. Further, the program storage also stores therein a program for implementing a wafer processing to be described later in the wafer processing system 1 by controlling the above-described various processing apparatuses and a driving system such as the transfer devices. In addition, the program storage also stores therein a program for implementing a modifying processing to be described layer in the modifying apparatus 60 by controlling operations of the aforementioned thinning processing. Further, the programs may be recorded in a computer-readable recording medium H, and may be installed from this recording medium H to the control device 90.

Figure 5:
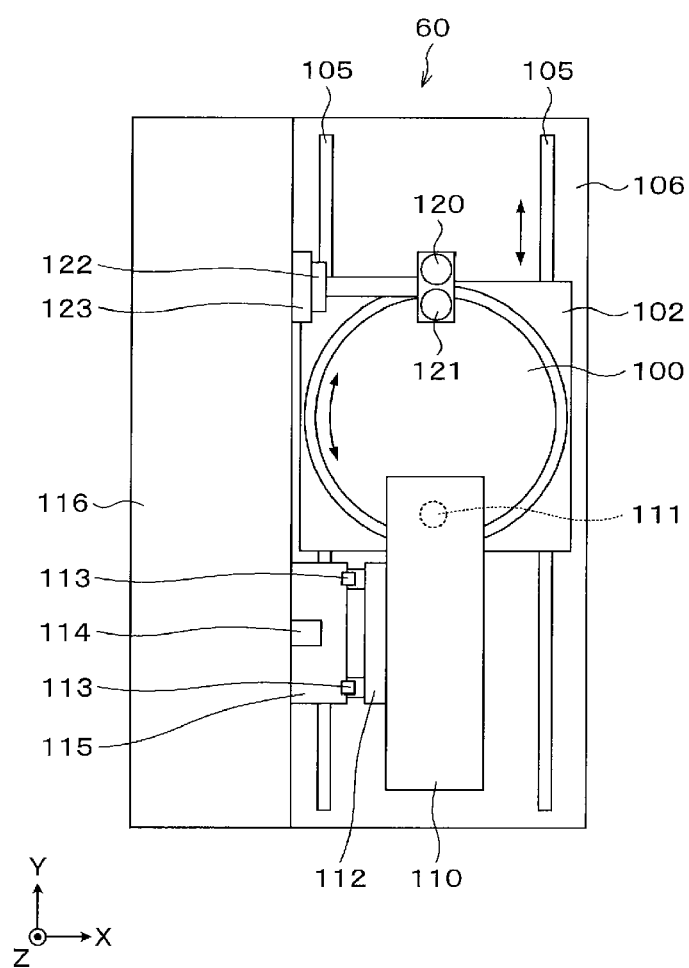
FIG. 5 is a plan view schematically illustrating a configuration of a modifying apparatus.
Figure 6:
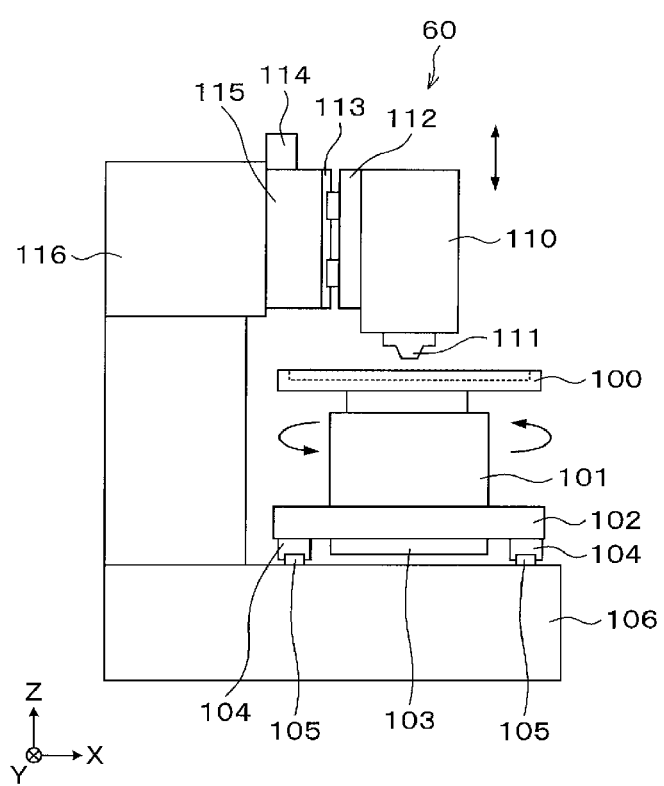
FIG. 6 is a side view schematically illustrating the configuration of the modifying apparatus.

Now, the aforementioned modifying apparatus 60 will be described. FIG. 5 and FIG. 6 are a plan view and a side view illustrating a schematic configuration of the modifying apparatus 60, respectively.

The modifying apparatus 60 is equipped with a chuck 100 configured to hold the combined wafer T on a top surface thereof. The chuck 100 is configured to attract and hold the rear surface Sb of the support wafer S in the state that the processing target wafer W is placed at an upper side and the support wafer S is placed at a lower side. The chuck 100 is supported on a slider table 102 with an air bearing 101 therebetween. A rotating mechanism 103 is provided at a bottom surface side of the slider table 102. The rotating mechanism 103 incorporates therein, for example, a motor as a driving source. The chuck 100 is configured to be rotated around a vertical axis by the rotating mechanism 103 via the air bearing 101 therebetween. The slider table 102 is configured to be moved by a moving member 104, which is provided at a bottom surface side thereof, along a rail 105 which is provided on a base 106 and elongated in the Y-axis direction. Further, though not particularly limited, a driving source of the moving member 104 may be, for example, a linear motor.

A laser head 110 serving as a modifying device is provided above the chuck 100. The laser head 110 has a lens 111. The lens 111 is a cylindrical member provided on a bottom surface of the laser head 110, and is configured to radiate the laser light to the processing target wafer W held by the chuck 100.

The laser head 110 is configured to concentrate and radiate the laser light having a wavelength featuring transmissivity for the processing target wafer W to a preset position within the processing target wafer W as high-frequency laser light in a pulse shape oscillated from a laser light oscillator (not shown). Accordingly, a portion within the processing target wafer W to which the laser light is concentrated is modified, so that an internal modification layer M1 and a peripheral modification layer M2 are formed.

The laser head 110 is supported at a supporting member 112. The laser head 110 is configured to be moved up and down by an elevating mechanism 114 along a vertically elongated rail 113. Further, the laser head 110 is configured to be moved in the Y-axis direction by a moving mechanism 115. Each of the elevating mechanism 114 and the moving mechanism 115 is supported at a supporting column 116.

Above the chuck 100, a macro-camera 120 and a micro-camera 121 are provided at a positive Y-axis side of the laser head 110. For example, the macro-camera 120 and the micro-camera 121 are formed as one body, and the macro-camera 120 is provided at a positive Y-axis side of the micro-camera 121. The macro-camera 120 and the micro-camera 121 are configured to be moved up and down by an elevating mechanism 122, and also configured to be moved in the Y-axis direction by a moving mechanism 123.

The macro-camera 120 is configured to image an outer end portion of the processing target wafer W (combined wafer T). The macro-camera 120 is equipped with, for example, a coaxial lens, and radiates visible light, for example, red light and receives reflection light from a target object. For example, the macro-camera 120 has an image magnification of two times.

The micro-camera 121 is configured to image a peripheral portion of the processing target wafer W and image a boundary between the bonding region Aa and the non-bonding region Ab. The micro-camera 121 is equipped with, for example, a coaxial lens, and radiates infrared light (IR light) and receives reflection light from a target object. By way of example, the micro-camera 121 has an image magnification of 10 times. A field of view of the micro-camera 121 is about 1/5 of a field of view of the macro-camera 120, and a pixel size of the micro-camera 121 is about 1/5 of a pixel size of the macro-camera 120.

Figure 7:
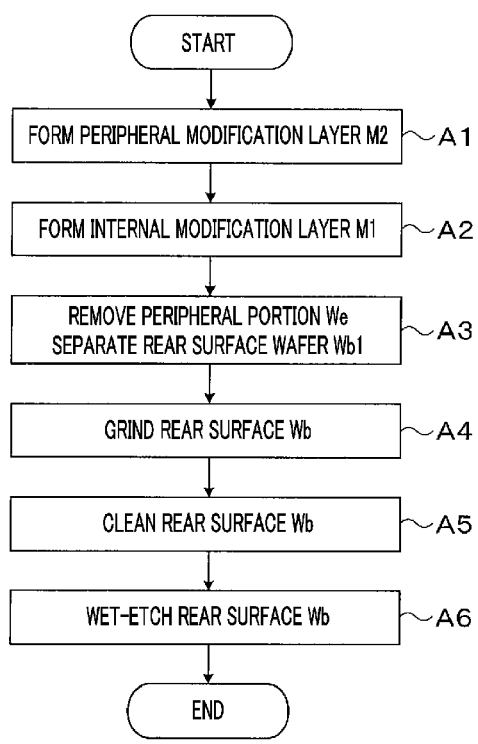
FIG. 7 is a flowchart illustrating main processes of a wafer processing.

Now, a wafer processing performed by using the wafer processing system 1 configured as described above will be discussed. FIG. 7 is a flowchart illustrating main processes of the wafer processing. FIG. 8A to FIG. 8E are explanatory diagrams illustrating the main processes of the wafer processing. In the present exemplary embodiment, the combined wafer T is previously formed by bonding the processing target wafer W and the support wafer S in the bonding apparatus (not shown) at the outside of the wafer processing system 1. Further, although the following description is provided for the example where the combined wafer T having the aforementioned non-bonding region Ab previously formed threat is carried into the wafer processing system 1, the non-bonding region Ab may be formed in the modifying apparatus 60.

Figure 8A:
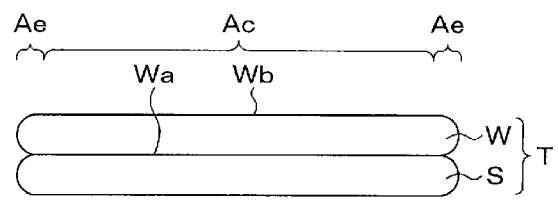
FIG. 8A to FIG. 8E are explanatory diagrams illustrating the main processes of the wafer processing.

First, the cassette Ct accommodating therein the multiple number of combined wafers T shown in FIG. 8A is placed on the cassette placing table 10 of the carry-in/out station 2.

Figure 8B:
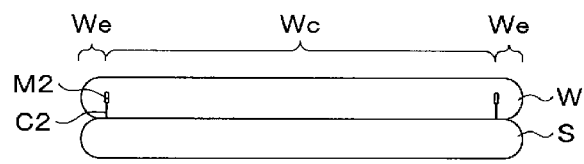
Figure 8C:
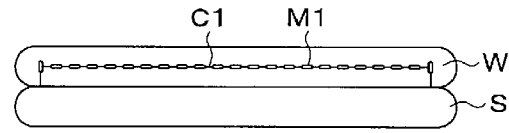

Then, the combined wafer T is taken out of the cassette Ct by the wafer transfer device 20, and transferred into the transition device 30. Subsequently, the combined wafer T is taken out of the transition device 30 by the wafer transfer device 50, and transferred into the modifying apparatus 60. In the modifying apparatus 60, a peripheral modification layer M2 is formed inside the processing target wafer W, as shown in FIG. 8B (process A1 of FIG. 7), and an internal modification layer M1 is formed, as illustrated in FIG. 8C (process A2 of FIG. 7). The peripheral modification layer M2 serves as a starting point when the peripheral portion We is removed in the edge trimming. The internal modification layer M1 serves as a starting point for separating the processing target wafer W.

In the modifying apparatus 60, the combined wafer T is carried into the modifying apparatus 60 by the wafer transfer device 50, and held on the chuck 100. Then, the chuck 100 is moved to a macro-alignment position. The macro-alignment position is a position where the macro-camera 120 is capable of imaging the outer end portion of the processing target wafer W.

Thereafter, the outer end portion of the processing target wafer W is imaged by the macro-camera 120 in 360 degrees in a circumferential direction of the processing target wafer W. The obtained image is outputted to the control device 90 from the macro-camera 120.

In the control device 90, a first eccentric amount between a center of the chuck 100 and a center of the processing target wafer W is calculated from the image obtained by the macro-camera 120. Further, in the control device 90, a moving amount of the chuck 100 is calculated based on the first eccentric amount to correct a Y-axis component of the first eccentric amount. The chuck 100 is moved in the Y-axis direction based on the calculated moving amount, and then moved to a micro-alignment position. The micro-alignment position is a position where the micro-camera 121 is capable of imaging the peripheral portion of the processing target wafer W. Here, the field of view of the micro-camera 121 is smaller (about ⅕) than the field of view of the macro-camera 120, as stated above. Thus, if the Y-axis component of the first eccentric amount is not corrected, the peripheral portion of the processing target wafer W may not be included in an angle of view of the micro-camera 121, resulting in a failure to image the peripheral portion of the processing target wafer W with the micro-camera 121. For the reason, the correction of the Y-axis component based on the first eccentric amount is performed to move the chuck 100 to the micro-alignment position.

Subsequently, the boundary between the bonding region Aa and the non-bonding region Ab is imaged by the micro-camera 121 in 360 degrees in the circumferential direction of the processing target wafer W. The obtained image is outputted to the control device 90 from the micro-camera 121.

In the control device 90, a second eccentric amount between the center of the chuck 100 and the center of the bonding region Aa is calculated from the image obtained by the micro-camera 121. Further, in the control device 90, the position of the chuck 100 with respect to the peripheral modification layer M2 is decided based on the second eccentric amount such that the center of the bonding region Aa and the center of the chuck 100 are coincident with each other.

Subsequently, as illustrated in FIG. 4 and FIG. 9, by radiating laser light L1 (laser light for periphery, for example, YAG laser) from the laser head 110, the peripheral modification layer M2 is formed at the boundary between the peripheral portion We and the central portion Wc of the processing target wafer W (process A1 of FIG. 7). Further, within the processing target wafer W, a crack C2 develops from the peripheral modification layer M2 in a thickness direction of the processing target wafer W. The crack C2 reaches the front surface Wa but does not reach the rear surface Wb.

A lower end of the peripheral modification layer M2 formed by the laser light L1 is located above a surface of the separated processing target wafer W after being finally processed. That is, the formation position of the peripheral modification layer M2 is adjusted such that the peripheral modification layer M2 is not left in the processing target wafer W after being separated.

In the process A1, to locate the chuck 100 at the position decided by the control device 90, the chuck 100 is rotated by the rotating mechanism 103 so that the center of the bonding region Aa and the center of the chuck 100 are coincident, and, also, the chuck 100 is moved in the Y-direction by the moving mechanism 104. At this time, the rotation of chuck 100 and the movement of the chuck 100 in the Y-axis direction are synchronized.

While rotating and moving the chuck 100 (processing target wafer W) as described above, the laser light L1 is radiated to the inside of the processing target wafer W from the laser head 110. That is, while correcting the second eccentric amount, the peripheral modification layer M2 is formed. The peripheral modification layer M2 is formed in a ring shape to be concentric with the bonding region Aa. Accordingly, the peripheral portion We can be appropriately removed later, starting from the peripheral modification layer M2 (crack C2).

Further, in the present exemplary embodiment, if the second eccentric amount includes an X-axis component, this X-axis component is corrected by rotating the chuck 100 while moving it in the Y-axis direction. Meanwhile, if the second eccentric amount does not include the X-axis component, the chuck 100 only needs to be moved in the Y-axis direction without being rotated.

Figure 10:
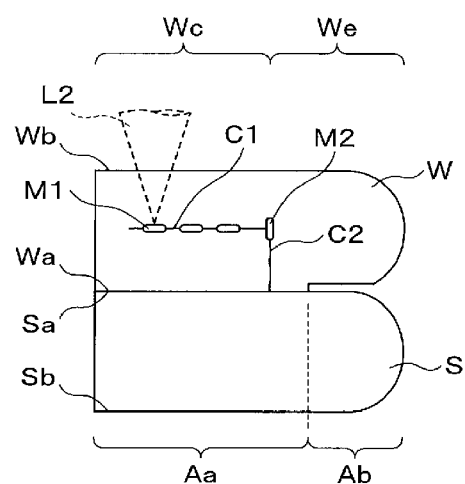
FIG. 10 is an explanatory diagram illustrating a state in which the internal modification layer is being formed in the processing target wafer.
Figure 11:
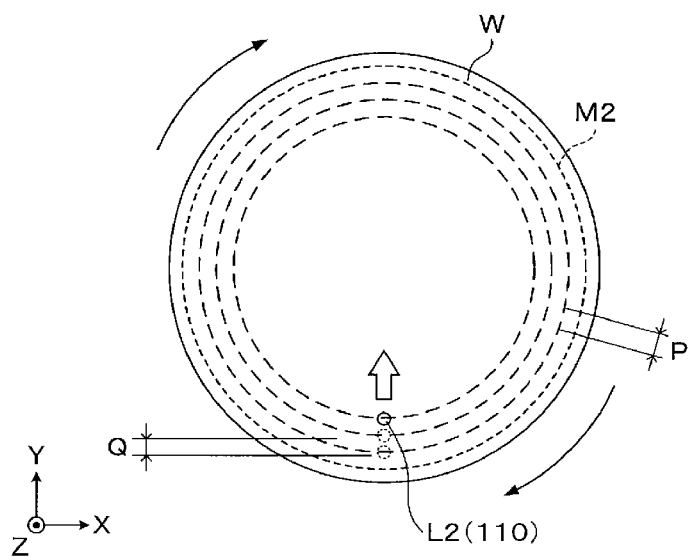
FIG. 11 is an explanatory diagram illustrating a state in which the internal modification layer is being formed in the processing target wafer.

Thereafter, as depicted in FIG. 10 and FIG. 11, by radiating laser light L2 (laser light L for internal surface, for example, YAG laser) from the laser head 110, the internal modification layer M1 is formed along a plane direction of the processing target wafer W (process A2 of FIG. 7). Black arrows shown in FIG. 11 indicate a rotation direction of the chuck 100. Further, within the processing target wafer W, a crack C1 develops from the internal modification layer M1 along the plane direction. The crack C1 develops only inwards in a diametrical direction of the peripheral modification layer M2.

Figure 12:
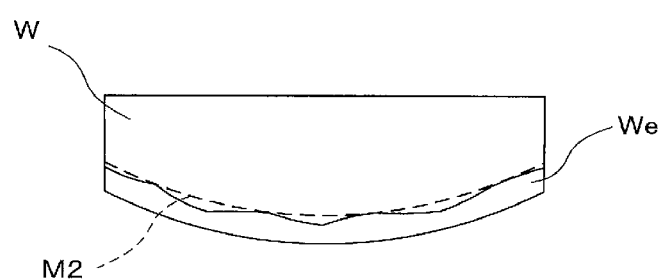
FIG. 12 is an explanatory diagram illustrating a state in which a periphery of the processing target wafer is being removed.

In addition, if the internal modification layer M1 is formed at a diametrically outer side than the peripheral modification layer M2, the quality of the edge trim after the peripheral portion We is removed may be degraded, as illustrated in FIG. 12. That is, the peripheral portion We may not be appropriately removed starting from the peripheral modification layer M2 (crack C2), and a part of the peripheral portion We may remain on the support wafer S. From this point of view, the formation position of the internal modification layer M1 is adjusted so that it is formed at a diametrically inner side than the peripheral modification layer M2.

Furthermore, a lower end of the internal modification layer M1 formed by the laser light L2 is located above the surface of the separated processing target wafer W after being finally processed. That is, the formation position of the internal modification layer M1 is adjusted such that the internal modification layer M1 is not left within the processing target wafer W after being separated.

In the process A2, after a rotation speed of the chuck 100 is rate-controlled (becomes constant) after the beginning of the rotation of the chuck 100, the laser light L2 is periodically radiated to the inside of the processing target wafer W from the laser head 110 while rotating the chuck 100 (processing target wafer W) at least one round (360 degrees), so that the internal modification layer M1 is formed in a ring shape. Then, the laser head 110 is relatively moved inwards in the diametrical direction of the processing target wafer W (Y-axis direction). By repeating the formation of the ring-shaped internal modification layer M1 and the inward movement of the laser head 110 in the diametrical direction, internal modification layers M1 are formed along the plane direction. Details of the method of forming the internal modification layers M1 will be described later.

Further, in the present exemplary embodiment, although the laser head 110 is moved in the Y-axis direction in forming the internal modification layers M1, the chuck 100 may be moved in the Y-axis direction. In addition, although the chuck 100 is rotated in forming the internal modification layers M1, the laser head 110 may be moved to rotate the laser head 110 relative to the chuck 100.

After the internal modification layers M1 are formed in the processing target wafer W, the combined wafer T is then carried out of the modifying apparatus 60 by the wafer transfer device 70.

Figure 8D:
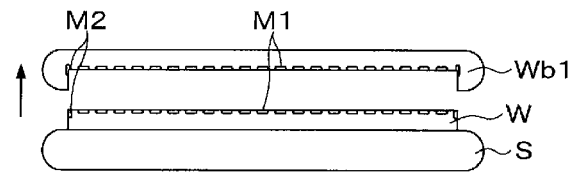

Then, the combined wafer T is transferred into the processing apparatus 80 by the wafer transfer device 70. In the processing apparatus 80, when the combined wafer T is delivered from the transfer ram 71 onto the chuck 83, the front surface Wa side of the processing target wafer W (hereinafter, referred to as "device wafer Wa1") and the rear surface Wb side thereof (hereinafter, referred to as "rear surface wafer Wb1") are separated starting from the peripheral modification layer M2 and the internal modification layers M1 (process A3 of FIG. 7), as illustrated in FIG. 8D. At this time, the peripheral portion We is also removed from the processing target wafer W.

Figure 15A:
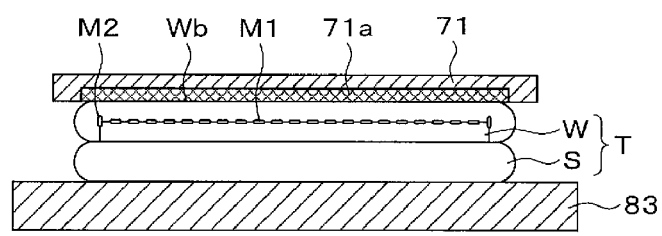
FIG. 15A and FIG. 15B are explanatory diagrams illustrating a state in which a rear surface wafer is being separated from the processing target wafer.
Figure 15B:
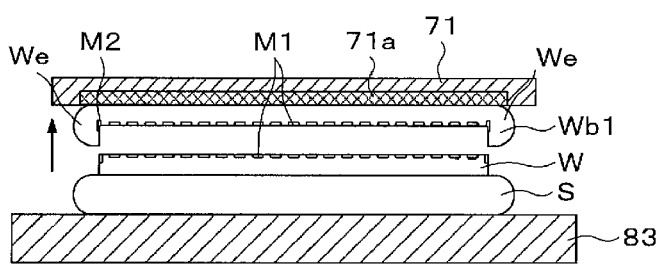

In the process A3, the support wafer S is attracted to and held by the chuck 83 while the processing target wafer W is attracted to and held with an attraction surface 71a of the transfer arm 71, as shown in FIG. 15A. Then, as shown in FIG. 15B, the transfer arm 71 is raised in the state that the rear surface wafer Wb1 is attracted to and held by the attraction surface 71a, so that the device wafer Wa1 and the rear surface wafer Wb1 are separated. The separated rear surface wafer Wb1 is collected to the outside of the wafer processing system 1. As stated above, in the process A3, the rear surface wafer Wb1 is separated as one body with the peripheral portion We. That is, the removal of the peripheral portion We and the separation of the processing target wafer W are performed at the same time.

In addition, the separated rear surface wafer Wb1 is collected to, for example, the outside of the wafer processing system 1. By way of example, a collector (not shown) may be provided within a movable range of the transfer arm 71, and the separated rear surface wafer Wb1 may be collected by releasing the attraction of the rear surface wafer Wb1 in the collector.

Furthermore, to separate the processing target wafer W, the rear surface wafer Wb1 may be cut from the processing target wafer W by inserting, for example, a wedge-shaped blade into an interface between the processing target wafer W and the support wafer S of the combined wafer T. Then, the rear surface wafer Wb1 may be attracted, as described above.

Additionally, in the present exemplary embodiment, although the processing target wafer W is separated by raising the transfer arm 71, the transfer arm 71 may be raised after the rear surface wafer Wb1 is cut along the internal modification layers M1 and the peripheral modification layer M2 by rotating the attraction surface 71a of the transfer arm 71. Further, by measuring a pressure for suctioning the rear surface wafer Wb1 with a pressure sensor (not shown) provided at the transfer arm 71, for example, presence or absence of the rear surface wafer Wb1 may be detected, and, thus, it can be checked whether the rear surface wafer Wb1 is separated from the processing target wafer W.

In the present exemplary embodiment, the processing target wafer W is separated by using the wafer transfer device 70 in the processing apparatus 80. However, a separation apparatus (not shown) for separating the processing target wafer W may be provided in the wafer processing system 1. This separation apparatus may be stacked on, for example, the modifying apparatus 60.

Figure 8E:
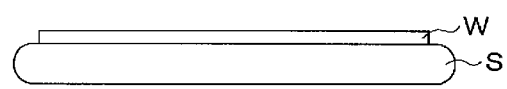

Next, the chuck 83 is moved to the processing position B0. Then, as shown in FIG. 8E, the separated surface of the processing target wafer W held by the chuck 83 is ground by the grinding unit 84, and the internal modification layers M1 and the peripheral modification layer M2 remaining on the separated surface are removed (process A4 of FIG. 7). In the process A4, by respectively rotating the processing target wafer W and the grinding whetstone while keeping the grinding whetstone in contact with the separated surface, the separated surface is ground. Further, the separated surface of the processing target wafer W may be then cleaned by a cleaning liquid by using a cleaning nozzle (not shown).

Subsequently, the combined wafer T is transferred to the cleaning apparatus 41 by the wafer transfer device 70. In the cleaning apparatus 41, the ground separated surface of the processing target wafer W is scrub-cleaned (process A5 of FIG. 7). Further, in the cleaning apparatus 41, the rear surface Sb of the support wafer S as well as the separated surface of the processing target wafer W may be cleaned.

Afterwards, the combined wafer T is transferred to the etching apparatus 40 by the wafer transfer device 50. In the etching apparatus 40, the separated surface of the processing target wafer W is wet-etched by a chemical liquid (process A6 of FIG. 7). A grinding mark may be formed on the separated surface ground by the aforementioned processing apparatus 80. In the process A6, the grinding mark can be removed by performing the wet-etching, so that the separated surface can be flattened.

Then, the combined wafer T after being subjected to all the required processings is transferred to the transition device 30 by the wafer transfer device 50, and then transferred into the cassette Ct on the cassette placing table 10 by the wafer transfer device 20. Accordingly, a series of the processes of the wafer processing in the wafer processing system 1 is ended.

In the above exemplary embodiment, after the processing target wafer W is separated in the process A3, the internal modification layers M1 and the peripheral modification layer M2 are removed through the grinding of the separated surface of the processing target wafer W in the process A4. However, the removal of the internal modification layers M1 and the peripheral modification layer M2 may be carried out by the wet etching in the process A6. In this case, the process A4 may be omitted.

Moreover, if the internal modification layers M1 and the peripheral modification layer M2 are removed by grinding the separated surface of the processing target wafer W in the process A4, the wet-etching in the process A6 may be omitted.

In addition, the sequence of forming the peripheral modification layer M2 and the internal modification layer M1 in the processes A1 and A2 may not be limited thereto, and the internal modification layers M1 may be formed before the peripheral modification layer M2.

Further, if the non-bonding region Ab is formed by the modifying apparatus 60, the non-bonding region Ab may be formed at any time.

For example, the non-bonding region Ab may be formed before the aforementioned macro-alignment and after it is carried into the modifying apparatus 60. In this case, the above-stated micro-alignment (calculating the second eccentric amount between the center of the chuck 100 and the bonding region Aa by imaging the boundary of the non-bonding region Ab) can be appropriately performed.

By way of example, the non-bonding region Ab may be formed after the formation of the peripheral modification layer M2 in the process A1 or the formation of the internal modification layer M1 in the process A2. In this case, the above-stated micro-alignment may be omitted, and the formation of the peripheral modification layer M2 in the process A1 is performed based on the result of the macro-alignment.

In addition, in order to perform the separation of the processing target wafer W uniformly within the surface thereof in the above-described process A3, it is desirable that a formation interval of the internal modification layers M1 is uniform. In order to control the formation interval to be constant, the rotation speed of the chuck 100 and a frequency of the laser light L are controlled in the formation of the internal modification layers M1 in the process A2.

If, however, the rotation speed of the chuck 100 reaches an upper limit and the frequency of the laser light L reaches a lower limit, a circumferential interval P of the internal modification layers M1 in the circumferential direction, may reach a threshold and cannot be enlarged any more. In this state, if the radiation position of the laser light L1 is further moved inwards in the radial direction, the circumferential interval P may be reduced, and the internal modification layers M1 may be overlapped on the same processing line in a central portion of the processing target wafer W. As a result, the central portion of the processing target wafer W may not be separated properly.

The reason why the central portion of the processing target wafer W cannot be separated will be discussed in further detail. If the internal modification layer M1 is formed by the radiation of the laser light L1, this internal modification layer M1 expands. The crack C1 is formed by a stress generated when this expansion occurs. If, for example, the internal modification layers M1 are overlapped, it becomes difficult for the crack C1 to develop in the diametrical direction as the next (second) laser light L is radiated to the first formed internal modification layer M1. Further, even if the internal modification layers M1 are not overlapped, if the circumferential interval P is smaller than a certain threshold, the next (second) laser light L is radiated to the crack C1 which is developing from the first formed internal modification layer M1. In this case, since the laser light L1 is radiated to the crack C1 from which the stress is already released, it becomes difficult again for the crack C1 to develop in the diametrical direction. As stated above, since the crack C1 may not be properly developed in the central portion of the processing target wafer W, there may arise a case when the corresponding central portion may not be separated.

Further, if the internal modification layers M1 are formed while being overlapped as described above, transmitted light of the next (second) laser light L may be generated. That is, some of the laser light L, which is not consumed in forming the internal modification layer M1, may be transmitted downwards, affecting the device layer D.

Figure 13:
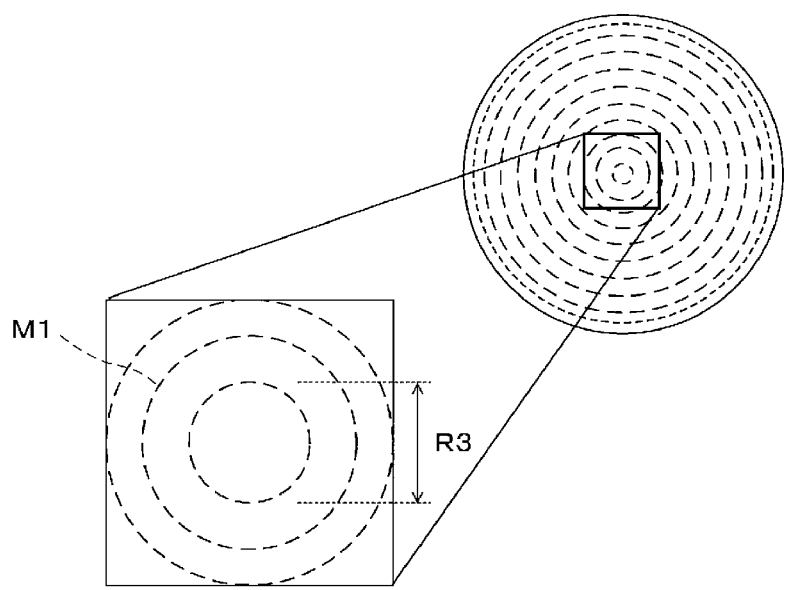
FIG. 13 is an explanatory diagram illustrating a central modification layer formed in the processing target wafer.

Therefore, near the central portion of the processing target wafer W where the circumferential interval P of the internal modification layer M1 reaches the threshold, it is desirable to end the formation of the internal modification layer M1, as shown in FIG. 13. The range of this non-formation region of the internal modification layer M1 (a formation region R3 of a central modification layer M3 to be described later) can be calculated from, for example, a minimum value of the frequency of the laser light L and a maximum value of the rotation speed of the chuck 100 (for example, a range of about 1 mm to 2 mm from the center of the processing target wafer W).

In this way, the formation of the internal modification layer M1 is terminated at a required position calculated from the rotation speed of the chuck 100 and the frequency of the laser light, leaving the non-formation region of the internal modification layer M1. Thus, the overlapped formation of the internal modification layers M1 is suppressed, so that generation of the transmitted light of the laser light L can be suppressed.

In addition, if no modification layer is formed in the central portion of the processing target wafer W as shown in FIG. 13, the separation of the processing target wafer W may not be performed properly in this central portion. That is, since the device wafer Wa1 and the rear surface wafer Wb1 remain connected in the central portion, the separation therebetween may not be performed properly, and a surface roughness of a central portion of the separated surface of the processing target wafer W may be deteriorated.

Figure 14:
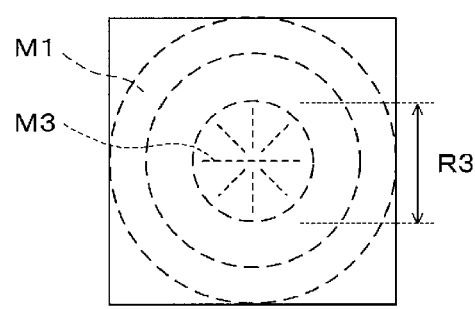
FIG. 14 is an explanatory diagram illustrating the central modification layer formed in the processing target wafer.

Thus, the present inventors have come up with a method of forming the central modification layer M3 as a way to separate the central portion of the processing target wafer W. That is, the formation of the internal modification layer M1 is terminated near the central portion of the processing target wafer W where the circumferential interval P reaches the threshold, and the central modification layer M3 is formed inside the internal modification layer M1 in the diametrical direction, as illustrated in FIG. 14. The formation region R3 of the central modification layer M3 can be calculated from the minimum value of the frequency of the laser light L and the maximum value of the rotation speed of the chuck 100 as stated above (for example, a range of about 1 mm to 2 mm from the center of the processing target wafer W).

In addition, the central modification layer M3 may be formed to have any of various shapes inside the internal modification layer M1 in the diametrical direction. For example, although the central modification layer M3 is formed by a plurality of (seven in the shown example) straight lines in FIG. 14, the shape of the central modification layer M3 may not be limited thereto. For example, the central modification layer M3 may be formed by less than 7, for example, only one straight line as long as the separation of the processing target wafer W in the central portion thereof can be performed appropriately. As stated above, by reducing the formation number of the central modification layer M3, tact for the formation of the central modification layer M3 can be reduced. Moreover, the shape of the central modification layer M3 is not limited to the linear shape. For example, the central modification layer M3 may be formed to have, for example, only a curved shape or a combination of the linear shape and the curved shape.

Here, if the central modification layers M3 are formed to cross each other, there is a likelihood that transmitted light of the laser light may be generated at an intersection thereof. In addition, if the central modification layers M3 are formed close to each other, cracks (not shown) that develop from these central modification layers M3 may be connected to each other. As a result, a protrusion may be formed in the central portion of the processing target wafer W, raising a likelihood that the flatness of the separated surface of the processing target wafer W may be reduced.

Thus, it is desirable that the central modification layers M3 are formed independently so as not to cross each other or to be close to each other, as shown in FIG. 14, such that the cracks (not shown) developing from the adjacent central modification layers M3 along the plane direction are not connected. Desirably, a formation interval of the central modification layers M3 may be equal to or larger than, e.g., 10 μm.

Further, as a product wafer having a device region with a plurality of devices formed on a front surface thereof and an outer extra region surrounding this device region, the rear surface wafer Wb1 shown in FIG. 15B may be reused. In this case, for the rear surface wafer Wb1 processed by the wafer processing system 1, the separated surface on which the internal modification layers M1 are formed may not be ground, and the peripheral portion We may be left.

Figure 16A:
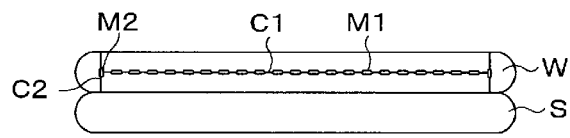
FIG. 16A and FIG. 16B are explanatory diagrams illustrating another method of separating the rear surface wafer from the processing target wafer.
Figure 16B:
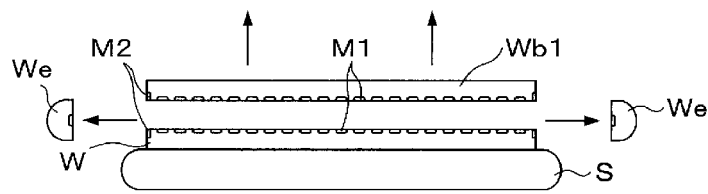

In addition, in the process A3 of the above-described exemplary embodiment, the rear surface wafer Wb1 is separated as one body with the peripheral portion We, that is, the removal of the peripheral portion We and the separation of the processing target wafer W are performed simultaneously. However, the rear surface wafer Wb1 and the peripheral portion We do not have to be separated at the same time. By way of example, after the peripheral portion We is removed by the edge trimming, the rear surface wafer Wb1 may be separated. In such a case, by allowing the crack C2 which develops from the peripheral modification layer M2 formed in the process A1 to reach the front surface Wa and the rear surface Wb, as shown in FIG. 16A, the edge trimming and the thinning can be performed appropriately, as illustrated in FIG. 16B. Further, there may be considered a case where the peripheral portion We is not removed. In such a case, the alignment of the processing target wafer W is performed using an outer end portion of the processing target wafer W instead of the boundary between the bonding region Aa and the non-bonding region Ab.

In addition, a rear surface film (for example, an oxide film or a nitride film) may be formed on the rear surface Wb of the processing target wafer W, which is an incident surface on which the laser light for forming the internal modification layer M1 and the peripheral modification layer M2 arrives. Examples of such a rear surface film may include a natural oxide film formed by exposure of the processing target wafer W to air, a protective film formed to protect the rear surface Wb of the processing target wafer W, a control film formed to adjust a bending amount of the processing target wafer W, and the like. If the rear surface film is formed on the processing target wafer W in this way, the internal modification layer M1 and the peripheral modification layer M2 may not be appropriately formed in some cases. Specifically, there is a likelihood that the laser light may be reflected or absorbed by the rear surface film, or autofocusing light in the radiation of the laser light may be affected by the rear surface film, resulting in a failure to properly control a processing height.

Thus, the rear surface film of the processing target wafer W may be removed prior to the radiation of the laser light in the formation of the modification layers. Any of various methods such as, but not limited to, wet etching, dry etching, plasma etching, and so forth may be used to remove the rear surface film.

As stated above, by removing the rear surface film before the radiation of the laser light, that is, before the formation of the modification layers, absorption and reflection of the laser light for forming the modification layer are suppressed, so that the internal modification layer M1 and the peripheral modification layer M2 can be appropriately formed at required positions and heights. Accordingly, the separation of the rear surface wafer Wb1 and the removal of the peripheral portion We can be carried out appropriately. Further, when the non-bonding region Ab is formed after the bonding of the processing target wafer W as described above, absorption and reflection of the laser light for forming the non-bonding region Ab can also be suppressed.

In addition, the removal of the rear surface film may be performed in the etching apparatus 40, or a rear surface film removing apparatus (not shown) as a rear surface film removing unit may be additionally provided in the wafer processing system 1.

Now, the internal modification layer M1 formed in the process A2 will be described. In the process A2, the plurality of ring-shaped internal modification layers M1 are formed in the diametrical direction, as stated above. In the following description, for convenience' sake, each ring may be referred to as a processing line. Further, as shown in FIG. 11, an interval between the adjacent internal modification layers M1 on the same processing line will be referred to as the circumferential interval P (pulse pitch), and an interval between the processing lines adjacent in the diametrical direction will be referred to as a diametrical interval Q (index pitch).

Conventionally, in the studies of the present inventors, when separating (detaching) the device wafer Wa1 and the rear surface wafer Wb1 of the processing target wafer W, cracks C1 that respectively develop from the internal modification layers M1 adjacent in the circumferential direction and the internal modification layers M1 adjacent in the diametrical direction are connected. Then, the device wafer Wa1 and the rear surface wafer Wb1 are separated using the cracks C1 as boundaries. However, even after the cracks C1 have developed, the device wafer Wa1 and the rear surface wafer Wb1 still remain connected at the portions where the internal modification layers M1 are formed, as mentioned above. Thus, an excessive force (for example, 300N or more) is required to separate the rear surface wafer Wb1.

In this regard, through intensive researches by the present inventors, it is found out that the force required for separating the rear surface wafer Wb1 can be reduced (for example, 16N) by forming regions with different diametrical intervals Q within the surface of the processing target wafer W.

Figure 17A:
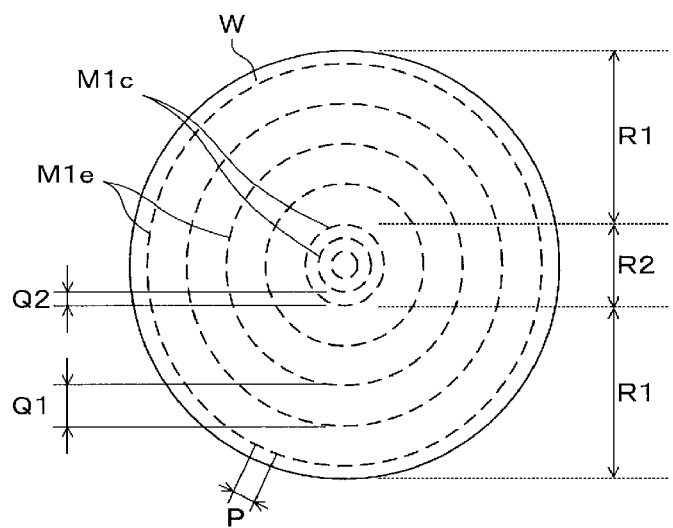
FIG. 17A and FIG. 17B are explanatory diagrams illustrating internal modification layers formed in the processing target wafer.
Figure 17B:
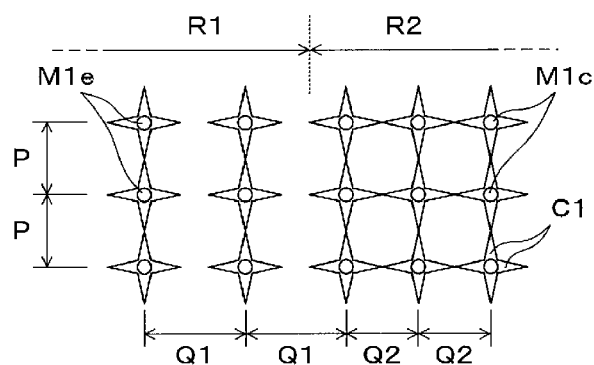

FIG. 17A and FIG. 17B illustrate internal modification layers M1 formed in the processing target wafer W by a modifying method according to the exemplary embodiment. FIG. 17A is a plan view, and FIG. 17B is an enlarged view illustrating a main portion of FIG. 17A.

As shown in FIG. 17A and FIG. 17B, in the processing target wafer W, there are formed regions where diametrical intervals Q between the internal modification layers M1 are different. Specifically, a wide-interval region R1 as a first modification layer formation region in which the diametrical interval Q between the neighboring internal modification layers M1 is set to be wide is formed at a diametrically outer side of the processing target wafer W, and a narrow-interval region R2 as a second modification layer formation region in which the diametrical interval Q between the neighboring internal modification layers M1 is set to be narrow is formed at a diametrically inner side than the wide-interval region R1. Further, the circumferential interval P of the internal modification layers M1 is constant over the entire circumference both in the wide-interval region R1 and the narrow-interval region R2.

Further, in the following description, the internal modification layer M1 formed in the wide-interval region R1 may sometimes be referred to as an outer modification layer M1e as a first modification layer, and the internal modification layer M1 formed in the narrow-interval region R2 may sometimes be referred to as an inner modification layer M1c as a second modification layer.

Here, in the wide-interval region R1, a formation interval Q1 of the neighboring outer modification layers M1e is set such that the cracks C1 which develop in the plane direction during the formation of these outer modification layers M1e are not connected to each other, as shown in FIG. 17B. Further, in the narrow-interval region R2, a formation interval Q2 of the neighboring inner modification layers M1c is set so that the cracks which develop in the plane direction during the formation of these neighboring inner modification layers M1c are connected to each other, as shown in FIG. 17B. As an example, the formation interval Q1 of the outer modification layers M1e may be 60 μm, and the formation interval Q2 of the inner modification layers M1c may be 10 μm.

Figure 18A:
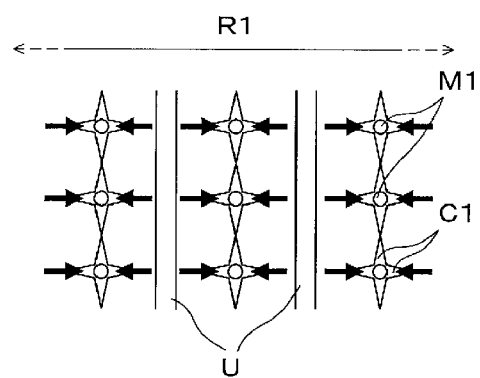
FIG. 18A and FIG. 18B are explanatory diagrams illustrating the internal modification layers formed in the processing target wafer.
Figure 18B:
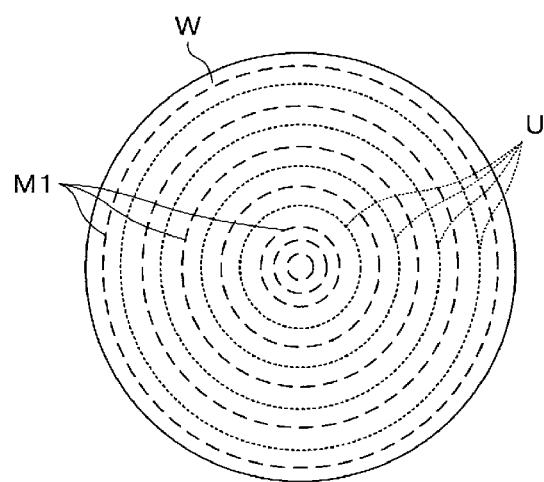

Further, the internal modification layer M1 is formed by radiating the laser light to the inside of the processing target wafer W to amorphize (non-crystallize) the portion to which the laser light is radiated. At this time, in the internal modification layer M1, a compressive stress is generated, as shown in FIG. 18A. Here, in the wide-interval region R1, since the cracks C1 of the adjacent outer modification layers Mle are not connected, the generated compressive stress is accumulated in the outer modification layers M1e. Accordingly, a tensile stress resulting from the compressive stress are accumulated between the outer modification layers Mle adjacent in the diametrical direction, as shown in FIG. 18A. Regions in which the tensile stress acts (hereinafter referred to as the "tensile regions U") are annularly formed over the entire circumference of the processing target wafer W, as shown in FIG. 18B.

Figure 19:
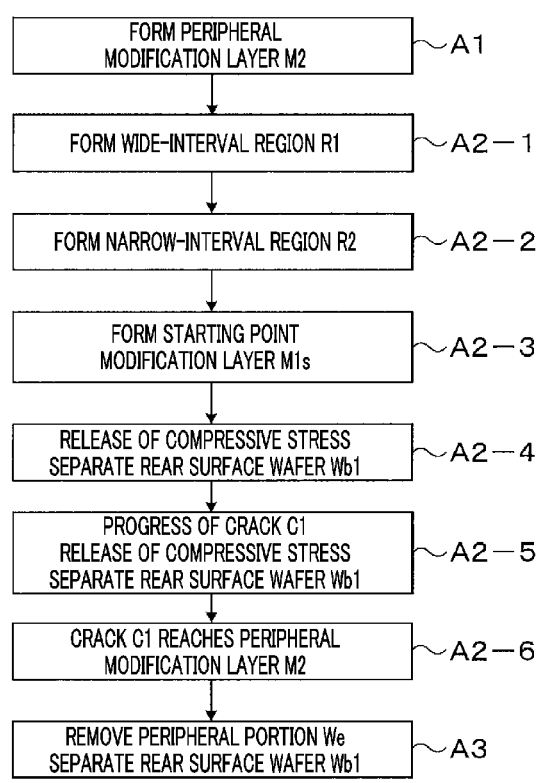
FIG. 19 is a flowchart illustrating main processes for the formation of the internal modification layers.

Now, a method of forming the wide-interval region R1 and the narrow-interval region R2 as described above, and a method of separating the processing target wafer W will be described. FIG. 19 is a flowchart showing main processes of the method of forming the internal modification layers M1 in the process A2 and the method of separating the processing target wafer W. FIG. 20A to FIG. 20E are explanatory diagrams schematically showing the main processes of the method of forming the internal modification layers M1 in the process A2 and the method of separating the processing target wafer W. Each of FIG. 20A to FIG. 20E illustrates a cross section of the half of the processing target wafer W in the diametrical direction, seen from a thickness direction thereof. In addition, in FIG. 20A to FIG. 20E, illustration of the support wafer S is omitted for the simplicity of illustration.

In addition, the peripheral modification layer M2 and the crack C2 are formed in the processing target wafer W prior to the formation of the internal modification layers M1 (process A1 in FIG. 7 and FIG. 19).

Figure 20A:
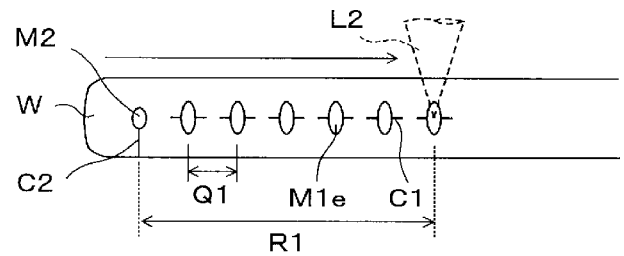
FIG. 20A to FIG. 20E are explanatory diagrams illustrating the main processes for the formation of the internal modification layers.

As depicted in FIG. 20A, in the formation of the internal modification layers M1, the wide-interval region R1 is first formed (process A2-1 of FIG. 19). By repeating the forming of the annular outer modification layer M1e and the moving of the laser head 110 as described above, the wide-interval region R1 is formed sequentially from the diametrically outer side of the processing target wafer W toward the diametrically inner side therein. The formation interval Q1 of the outer modification layers M1e is, for example, 60 μm. Here, the cracks C1 that develop from the adjacent outer modification layers M1e in the wide-interval region R1 are not connected.

Here, since the cracks C1 are not connected to each other, the compressive stresses are accumulated in the internal modification layers M1, and the tensile regions U are formed between the adjacent internal modification layers M1, as stated above.

Figure 20B:
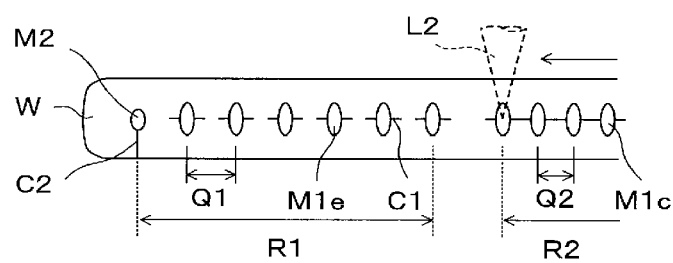

After the wide-interval region R1 is formed, the narrow-interval region R2 is formed, as illustrated in FIG. 20B (process A2-2 of FIG. 19). The narrow-interval region R2 is formed sequentially from the center of the processing target wafer W toward the outer side thereof in the diametrical direction by repeating the forming of the annular inner modification layer M1c and the moving of the laser head 110 as stated above. The formation interval Q2 of the inner modification layers M1c is, for example, 10 μm. Here, the cracks C1 that develop from the adjacent inner modification layers M1c in the narrow-interval region R2 are connected to each other sequentially.

Further, as illustrated in FIG. 20B, in the formation of the narrow-interval region R2 in the process A2-2, the crack C1 of the inner modification layer M1c located on the outermost side of the narrow-interval region R2 and the crack C1 of the outer modification layer M1e located on the innermost side of the wide-interval region R1 are not connected.

Figure 20C:
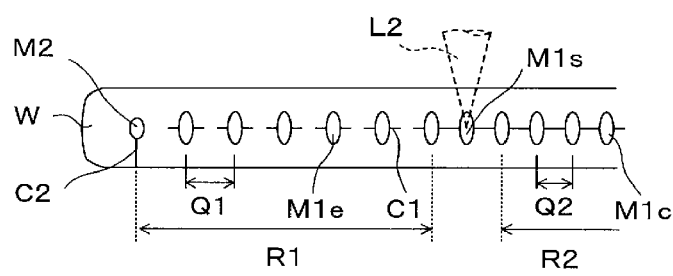

After the narrow-interval region R2 is formed, a starting point modification layer M1s serving as a starting point for the start of the separation of the processing target wafer W is formed, as depicted in FIG. 20C. Specifically, the internal modification layer M1 as the starting point modification layer M1s is formed between the wide-interval region R1 and the narrow-interval region R2. Accordingly, the crack C1 of the inner modification layer M1c located on the outermost side of the narrow-interval region R2 and the crack C1 of the one outer modification layer M1e positioned on the innermost side of the wide-interval region R1 are connected.

Figure 20D:
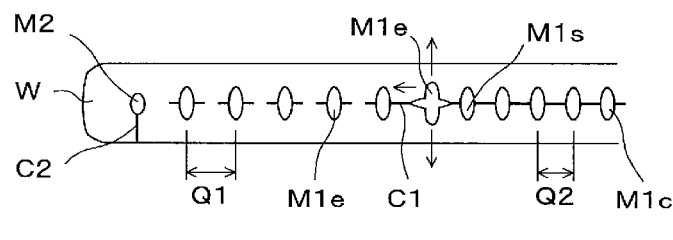

If the starting point modification layer M1s is formed, the cracks C1 of the wide-interval region R1 and the narrow-interval region R2 are connected, so that the compressive stress accumulated in the one outer modification layer M1e of the wide-interval region R1 is released. Then, by this release of the stress, the one outer modification layer M1e swells in a direction in which the device wafer Wa1 and the rear surface wafer Wb1 are detached, as shown in FIG. 20D. That is, at the position where the corresponding one outer modification layer M1e is formed, the device wafer Wa1 and the rear surface wafer Wb1 are detached with the crack C1 as the boundary (process A2-4 of FIG. 19).

In this way, if the device wafer Wa1 and the rear surface wafer Wb1 are detached at the position where the corresponding one outer modification layer M1e is formed, the crack C1 develops outwards in the diametrical direction, as shown in FIG. 20D, while being affected by the force acting in the thickness direction of the processing target wafer W due to the detachment. As a result, this crack C1 is connected to the crack C1 which is developing from the another outer modification layer M1e adjacent thereto (process A2-5 of FIG. 19).

If the cracks C1 of the one outer modification layer M1e and the another outer modification layer M1e are connected, the compressive stress accumulated in the another outer modification layer M1e is released. Then, by this release of the stress, the device wafer Wa1 and the rear surface wafer Wb1 are detached with the crack C1 as the boundary at the position where the another outer modification layer M1e is formed (process A2-5 of FIG. 19).

Then, if the device wafer Wa1 and the rear surface wafer Wb1 are detached in this way at the position where the other outer modification layer M1e is formed, the crack C1 is made to further proceed outwards in the diametrical direction while being affected by the force acting in the thickness direction of the processing target wafer W due to the detachment.

Figure 20E:
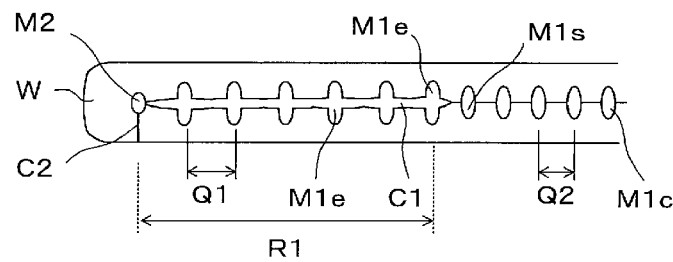

As the progress of the crack C1, the release of the compressive stress, and the detachment of the rear surface wafer Wb1 are repeated in a chain reaction in this way, the crack C1 reaches the peripheral modification layer M2, as illustrated in FIG. 20E (process A2-6 of FIG. 19).

If the internal modification layers M1 are formed in the entire surface of the processing target wafer W while the cracks C1 develop as stated above, the formation of the internal modification layers M1 in the process A2 is completed, and the peripheral portion We and the rear surface wafer Wb1 are removed thereafter (process A3 in FIG. 7 and FIG. 19).

According to the above-described exemplary embodiment, the internal modification layers M1 are formed in the processing target wafer W, and these internal modification layers M1 are divided into the wide-interval region R1 and the narrow-interval region R2. In the wide-interval region R1, the detachment of the device wafer Wa1 and the rear surface wafer Wb1 progresses in the chain reaction as stated above.

As stated above, according to the above-described exemplary embodiment, the gap is formed in the thickness direction within the processing target wafer W due to the detachment of the device wafer Wa1 and the rear surface wafer Wb1. That is, since the region in which the device wafer Wa1 and the rear surface wafer Wb1 are not connected is formed within the surface of the processing target wafer W, the force required for the subsequent detachment process of the rear surface wafer Wb1 is reduced. Specifically, if the internal modification layers M1 are formed as in the above-described exemplary embodiment, the force required to detach the rear surface wafer Wb1 is reduced to 16N, as compared to the conventional case where the force of 300N or more is required.

Moreover, by reducing the force required for the detachment as stated above, an apparatus provided for the detachment process can be simplified and downsized. More specifically, an assist member required to detach the rear surface wafer Wb1 can be simplified or even omitted.

Moreover, since the detachment can be carried out easily due to the reduced force required for the detachment, the throughput of the detachment process can be improved. Moreover, since the driving power required for the detachment can be reduced, energy consumed by the apparatus for the detachment can be reduced.

In addition, according to the above-described exemplary embodiment, since the number of the internal modification layers M1 to be formed in the wide-interval region R1 can be reduced, the time required for the formation of the internal modification layers M1 can be reduced, so that the throughput can be further improved.

Further, according to the above-described exemplary embodiment, the device wafer Wa1 and the rear surface wafer Wb1 in the wide-interval region R1 are separated along the cracks C1 that naturally develops by the release of the accumulated stress to be used as the starting point of the separation. For this reason, especially in the wide-interval region R1, a smooth separated surface having a regular structure can be obtained.

Figure 21B:
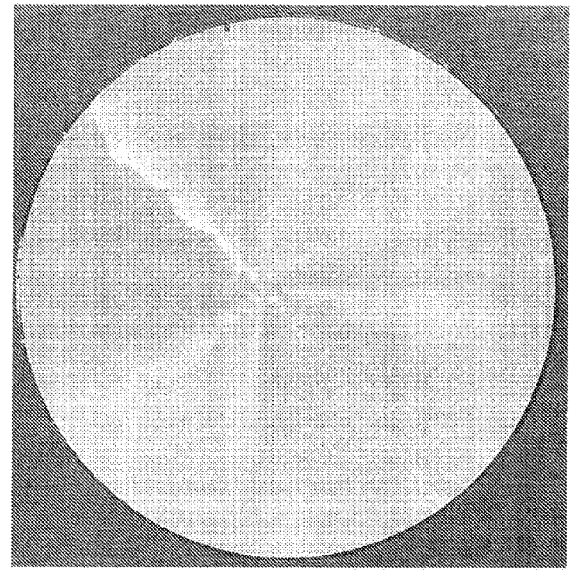
FIG. 21A and FIG. 21B are explanatory diagrams illustrating improvement of surface roughness of the processing target wafer.
Figure 21A:
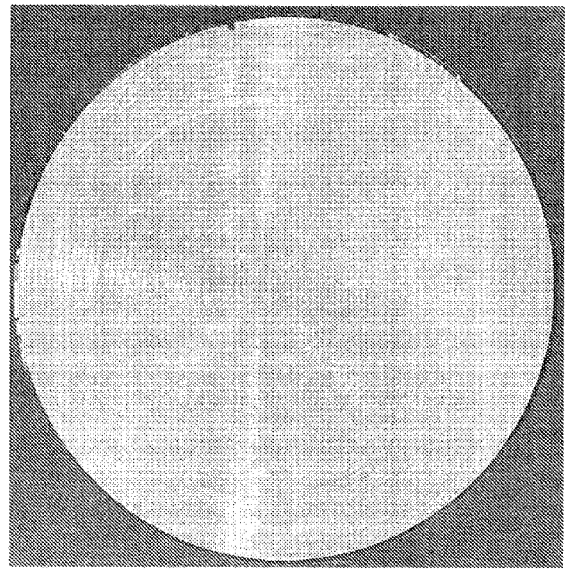

FIG. 21A shows a separated surface of the processing target wafer W when the internal modification layers M1 are formed with a constant index pitch of 60 μm within the entire surface of the processing target wafer W (conventional method), and FIG. 21B shows a separated surface of the processing target wafer W when the internal modification layers M1 are formed to form the wide-interval region R1 and the narrow-interval region R2 (the method according to the present exemplary embodiment). As can be seen from FIG. 21A and FIG. 21B, by forming the internal modification layers M1 such that the wide-interval region R1 and the narrow-interval region R2 are formed while allowing the cracks C1 to naturally develop by the release of the accumulated stress, the surface roughness after the separation is ameliorated, and the smooth separated surface can be obtained. Also, by obtaining such a smooth separated surface, the subsequent grinding processing in the processing apparatus 80 may be performed appropriately.

Meanwhile, the separated surface of the processing target wafer W may be roughened due to, for example, the modification of the portion of the processing target wafer W to which the laser light is radiated, and the aforementioned formation of the protrusion by the connection of the cracks. If the separated surface becomes too rough for these reasons, there is a concern that the grinding processing in the processing apparatus 80 may not be performed properly, or wear-out of the grinding whetstone which is a consumable may be accelerated.

Therefore, the laser light may be radiated to the separated surface of the processing target wafer W again in the modifying apparatus 60. Specifically, by radiating the laser light to the separated surface of the processing target wafer W again, the separated surface is annealed or a surface layer of the separated surface is removed. By changing (improving) the surface state of the separated surface in this way, grinding performance in the processing apparatus 80 can be improved, and the damage to the grinding whetstone can be reduced. Here, the "improvement of the surface state" of the separated surface means that the separated surface is at least flattened, that is, the surface irregularity thereof is reduced, as compared to the state immediately after the completion of the separation of the processing target wafer W.

Furthermore, the radiation of the laser light to the separated surface of the processing target wafer W may be performed in the modifying apparatus 60 as described above, or a separated surface modifying apparatus (not shown) may be further provided in the wafer processing system 1. In addition, the light radiated to the separated surface may not be limited to the laser light. For example, an electron beam (EB) may be used.

Further, in the above-described exemplary embodiment, although the formation interval Q1 of the outer modification layers M1e is set to be 60 μm and the formation interval Q2 of the inner modification layers M1c is set to be 10 μm, the formation interval of the internal modification layers M1 may not be limited thereto.

By way of example, the formation interval Q1 of the outer modification layers M1e in the wide-interval region R1 may not be particularly limited as long as the cracks C1 each developing from the outer modification layers Mie adjacent in the diametrical direction are not connected so the compressive stress can be accumulated.

The present inventors have intensively conducted research on the diametrical interval Q of the internal modification layers M1 and found out that it is determined whether or not the cracks C1 developing from the internal modification layers M1 in the diametrical direction are connected depending on whether the diametrical interval Q is over or below 40 μm. That is, it is desirable that the formation interval Q1 of the outer modification layers Mie in the wide-interval region R1 is larger than 40 μm at least. On the other hand, if the formation interval Q1 of the outer modification layers M1e is too large, the cracks C1 may not be properly connected when the rear surface wafer Wb1 is detached. In view of this, it is desirable that the diametrical interval Q in the wide-interval region R1 is smaller than 70 µm. That is, the formation interval Q1 of the outer modification layers M1e is desirably larger than 40 µm and smaller than 70 µm when the processing target wafer W is a silicon wafer having a diameter of 300 mm at least.

For example, in the narrow-interval region R2, the formation interval Q2 of the inner modification layers M1c may not be particularly limited as long as the cracks C1 each extending from the inner modification layers M1c adjacent in the diametrical direction are connected. That is, it is desirable that the formation interval Q2 of the inner modification layers M1c in the narrow-interval region R2 is 40 urn or less. On the other hand, when the formation interval Q2 of the inner modification layers M1c is too small, particularly when the inner modification layers M1c are formed while being overlapped with each other, there is a concern that the rear surface wafer Wb1 may not be appropriately detached. In view of this, it is desirable that the diametrical interval Q in the narrow-interval region R2 is at least larger than 10 µm. That is, the formation interval Q2 of the inner modification layers M1c is desirably equal to or less than 40 µm and larger than 10 µm when the processing target wafer W is a silicon wafer having a diameter of φ300 mm at least.

Further, in the above-described exemplary embodiment, the wide-interval region R1 is sequentially formed starting from the diametrically outer side of the processing target wafer W, whereas the narrow-interval region R2 is sequentially formed starting from the center side of the processing target wafer W. However, the directions in which the internal modification layers M1 are formed may not be limited thereto.

Moreover, the order in which the wide-interval region R1 and the narrow-interval region R2 are formed may not be limited to the example of the above-described exemplary embodiment, either. After the narrow-interval region R2 is formed, the wide-interval region R1 may be formed. Even in such a case, the detachment of the rear surface wafer Wb1 can be started by forming the starting point modification layer M1s between the wide-interval region R1 and the narrow-interval region R2.

Further, in the above-described exemplary embodiment, the cracks C1 are connected by forming the starting point modification layer M1s between the wide-interval region R1 and the narrow-interval region R2 so that the detachment of the rear surface wafer Wb1 is begun. However, the starting point modification layer M1s need not necessarily be formed. For example, after forming the wide-interval region R1, the cracks C1 may be connected by forming the narrow-interval region R2 so that the detachment of the rear surface wafer Wb1 may be started.

Moreover, in the above-described exemplary embodiment, the wide-interval region R1 is formed at the diametrically outer side of the processing target wafer W when viewed from the top, and the narrow-interval region R2 is formed inside the wide-interval region R1, as shown in FIG. 17A and FIG. 17B. However, the positions where the wide-interval region R1 and the narrow-interval region R2 may not be limited to the example of the above-described exemplary embodiment.

Figure 22A:
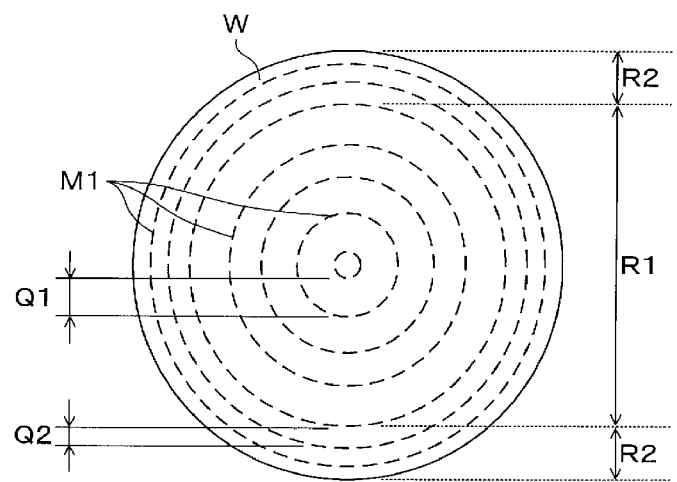
FIG. 22A and FIG. 22B are explanatory diagrams illustrating another method of forming internal modification layers in the processing target wafer.
Figure 22B:
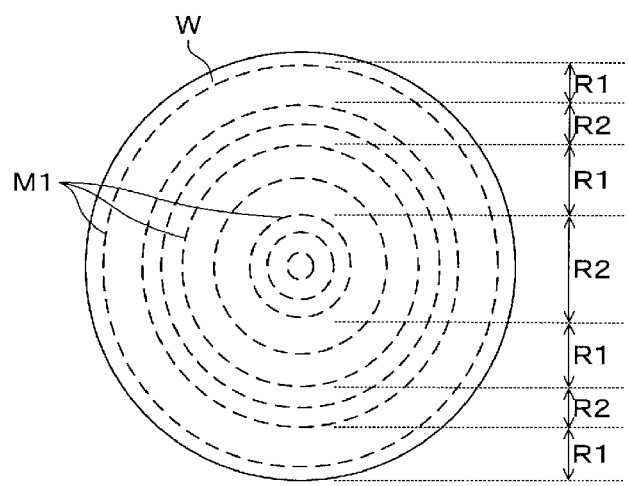

For example, as shown in FIG. 22A, the narrow-interval region R2 may be formed at the diametrically outer side of the processing target wafer W when viewed from the top, and the wide-interval region R1 may be formed inside the narrow-interval region R2. As another example, as shown in FIG. 22B, the wide-interval region R1 and the narrow-interval region R2 may be alternately formed at the diametrically outer side of the processing target wafer W.

Further, in the above-described exemplary embodiment, the wide-interval region R1 and the narrow-interval region R2 are formed with respect to the diametrical direction of the processing target wafer W, that is, the diametrical interval Q of the internal modification layers M1 is changed. Instead, however, the circumferential interval P (pulse pitch) may be changed. Moreover, both the diametrical interval Q and the circumferential interval P may be changed. In such a case, since the number of the internal modification layers M1 to be formed within the surface of the processing target wafer W is further reduced, the throughput can be further improved.

Figure 23:
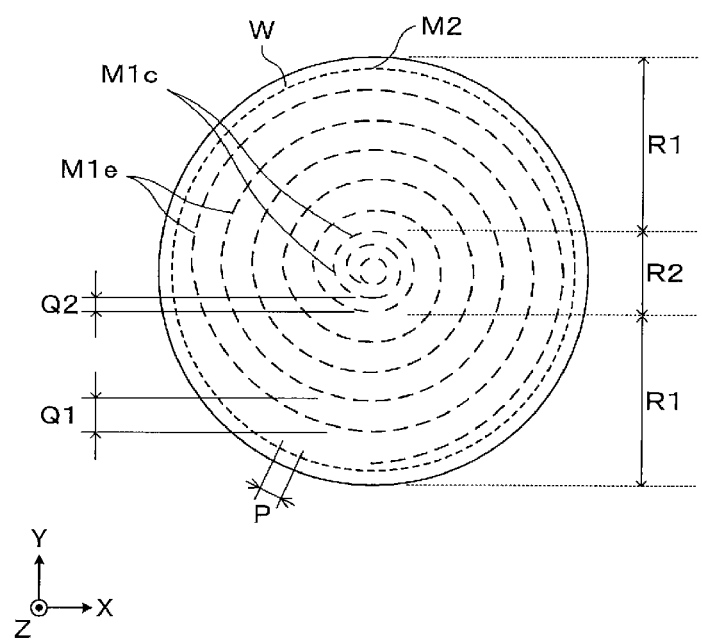
FIG. 23 is an explanatory diagram illustrating the internal modification layers formed in the processing target wafer.

Further, in the above-described exemplary embodiment, although the plurality of annular internal modification layers M1 are formed in the process A2, the internal modification layer M1 may be formed in a spiral shape from the outer side of the processing target wafer W toward the inside thereof in the diametrical direction, as illustrated in FIG. 23, for example. Specifically, while rotating the chuck 100 (processing target wafer W) and moving the laser head 110 in the Y-axis direction from the diametrically outer side of the processing target wafer W toward the diametrically inner side thereof, the laser light L2 is radiated to the inside of the processing target wafer W from the laser head 110. By forming the internal modification layer M1 in the spiral shape in this way, the internal modification layer M1 can be formed at once within the surface of the processing target wafer W. Thus, the tact according to the formation of the modification layers can be improved.

Further, when forming the internal modification layer M1 in the spiral shape as well, the corresponding internal modification layer M1 is formed at the diametrically inner side than the peripheral modification layer M2.

In addition, the internal modification layer M1 may be formed in the spiral shape from the diametrically inner side of the processing target wafer W toward the diametrically outer side thereof. That is, while moving the laser head 110 relatively in the Y-axis direction from the diametrically inner side of the processing target wafer W toward the diametrically outer side thereof, the laser light L2 may be radiated from the laser head 110 to the inside of the processing target wafer W periodically.

When forming the internal modification layer M1 in the spiral shape in this way, the wide-interval region R1 and the narrow-interval region R2 are formed, the same as in the above-described exemplary embodiment. With this configuration, the same effects as obtained in the above-described exemplary embodiment can be achieved. Further, the way how to form the wide-interval region R1 and the narrow-interval region R2 can be selected as required. For example, they may be formed continuously up to the center of the processing target wafer W from the diametrically outer side of the processing target wafer W toward the diametrically inner side thereof. As another example, after forming the wide-interval region R1 up to a predetermined position from the outer side of the processing target wafer W toward the inner side thereof in the diametrical direction as shown in FIG. 24A, the narrow-interval region R2 may be formed from the center of the processing target wafer W toward the diametrically outer side thereof to be joined with the internal modification layer M1 of the wide-interval region R1, as illustrated in FIG. 24B.

Figure 24A:
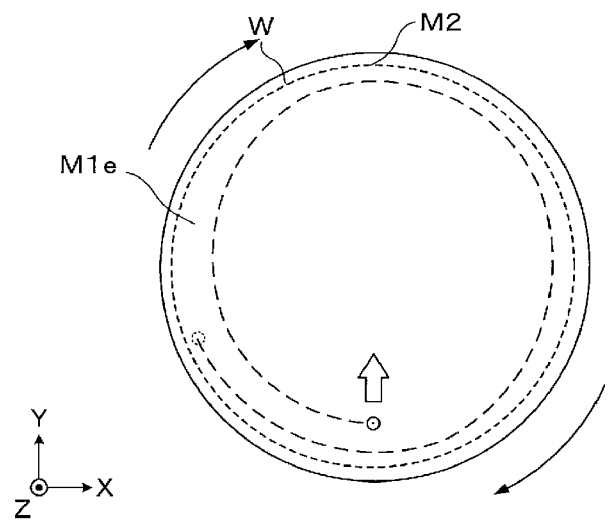
FIG. 24A and FIG. 24B are explanatory diagrams illustrating a state in which the internal modification layers are being formed in the processing target wafer.
Figure 24B:
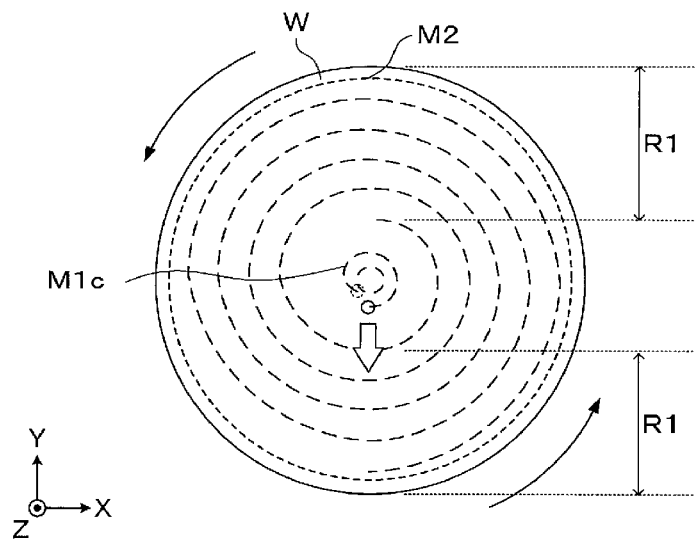

Further, when the internal modification layers M1 are formed starting from both the outer side and the inner side of the processing target wafer W to be joined within the surface of the processing target wafer W, as shown in FIG. 24A and FIG. 24B, the spiral shape is formed by appropriately joining the internal modification layers M1. Thus, it becomes important to adjust the joining position of the internal modification layers M1. Therefore, according to the present exemplary embodiment, a laser light radiation end position for the wide-interval region R1 and a laser light radiation end position for the narrow-interval region R2 need to be coincident.

Here, at the start and the end of the radiation of the laser light, there exists a delay time between a time when the control device 90 outputs a system signal and a time when the laser light is actually radiated from the laser head 110. In the formation of the internal modification layers M1, since the radiation of the laser light is performed while rotating the processing target wafer W as described above, the rotation of the processing target wafer W in the delay time mentioned above needs to be considered in the control of the radiation end position of the laser light. That is, the system signal for the end of the radiation of the laser light needs to be outputted before the laser head 110 reaches a position above the required laser light radiation end position.

In addition, when forming the internal modification layer M1 in the spiral shape, the rotation speed of the chuck 100 and the frequency of the laser light are controlled based on the position of the laser head 110 with respect to the processing target wafer W in order to make constant the circumferential interval P (pulse pitch) of the internal modification layers M1 to be formed. In other words, since the rotation speed differs depending on various conditions such as the laser light radiation end position, the moving amount according to the rotation of the processing target wafer W in the delay time may differ.

Thus, when the internal modification layers M1 are joined within the surface of the processing target wafer W as described above, it is desirable to control the timing for the end of the radiation of the laser light from the laser head 110 based on the delay time and the rotation speed of the processing target wafer W at the position to which the laser light is radiated. In addition, when the internal modification layers M1 are formed starting from both the outer side and inner side of the processing target wafer W as described above, it is desirable to control the timing for the start of the radiation of the laser light because the rotation speed of the processing target wafer W is different at the start of the radiation of the laser light as well.

Further, the control of the timing of the laser light radiation in consideration of the delay time may also be applied to, for example, a case of changing a radiation condition (for example, the frequency) of the laser light at a certain position within the surface of the processing target wafer W without being limited to the case of joining the internal modification layers M1 within the surface of the processing target wafer W. Further, the application of this control may not be limited to the case of forming the spiral-shaped internal modification layer M1 as described above, and it may also be appropriately applied to a case when a moving speed of a processing target object with respect to the laser head is changed.

In addition, the internal modification layers M1 need to be formed at the diametrically inner side than the peripheral modification layer M2 in order to suppress the deterioration of the quality of the edge trim. However, when the rotation axes of the chuck 100 and the processing target wafer W do not coincide with each other, that is, when the centers of the chuck 100 and the processing target wafer W do not coincide, the modification layers may be formed eccentrically with respect to the processing target wafer W. If the formation of the modification layers is performed without taking such eccentricity into consideration, there is a concern that the internal modification layers M1 may be formed at the outer side than the peripheral modification layer M2 in the diametrical direction.

Thus, in the modifying apparatus 60, in order to suppress the internal modification layers M1 from being formed at the diametrically outer side than the peripheral modification layer M2, it is desirable to correct the eccentricity in the formation of the modification layers. This eccentricity correction is performed by, for example, moving the chuck 100 and the laser head 110 in the horizontal directions (the X-axis direction and the Y-axis direction).

Figure 25:
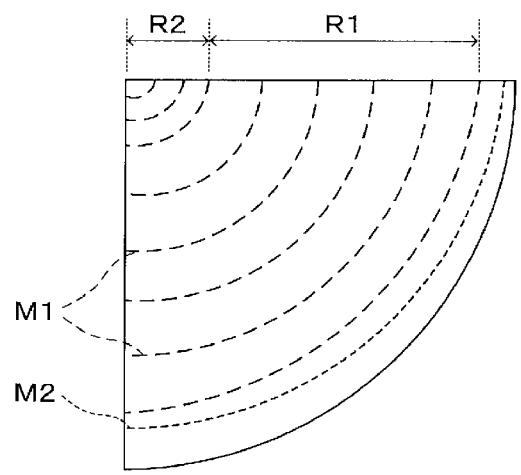
FIG. 25 is an explanatory diagram illustrating another method of forming internal modification layers in the processing target wafer.

FIG. 25 is an explanatory diagram showing a state of modification layers formed within the processing target wafer W by a first eccentricity correction method.

In case that the non-bonding region Ab is formed eccentrically with respect to the processing target wafer W, the peripheral modification layer M2 is formed to be concentric with the bonding region Aa (non-bonding region Ab) in the process A1. Accordingly, in the process A1 according to the first eccentricity correction method, the internal modification layers M1 are formed in a spiral shape along the peripheral modification layer M2 to be concentric therewith, that is, to follow the eccentricity of the bonding region Aa and the peripheral modification layer M2. That is, in the first eccentricity correction method, both the peripheral modification layer M2 and the internal modification layers M1 are formed while the eccentricity correction thereof is performed.

As described above, according to the first eccentricity correction method, by forming the internal modification layers M1 to be concentric with the peripheral modification layer M2 which is formed to follow the eccentricity of the bonding region Aa, formation of the internal modification layers M1 at the diametrically outer side than the peripheral modification layer M2 can be suppressed.

As described in the first eccentricity correction method, it is desirable that the internal modification layers M1 are formed to follow the eccentricity. If, however, the internal modification layers M1 are formed in the center portion of the processing target wafer W to follow this eccentricity, it is necessary to reciprocate the chuck 100 and the laser head 110 in the horizontal directions at a high speed. As a result, there are concerns that the eccentricity correcting operation may not be able to keep up with the operation of forming the internal modification layers M1, and resonance and guide lifetime may be reduced. Therefore, in a second eccentricity correction method to be described below, the eccentricity correcting operation is not performed at least in the center of the processing target wafer W.

Figure 26:
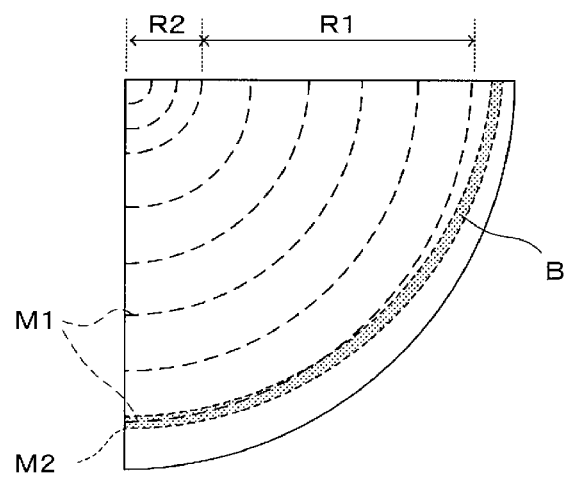
FIG. 26 is an explanatory diagram illustrating another method of forming internal modification layers in the processing target wafer.

FIG. 26 is an explanatory diagram showing a state of modification layers formed within the processing target wafer W by the second eccentricity correction method.

In case that the non-bonding region Ab is formed eccentrically with respect to the processing target wafer W, the peripheral modification layer M2 is formed to be concentric with the bonding region Aa (non-bonding region Ab) in the process A1.

Subsequently, in the second eccentricity correction method, a buffer layer B for absorbing the eccentricity of the bonding region Aa is formed along the peripheral modification layer M2 at the diametrically inner side while correcting the eccentricity of the chuck 100 (processing target wafer W). To elaborate, after the chuck 100 is rotated and the rotation speed thereof is rate-controlled (becomes constant), the laser light L is periodically radiated to the inside of the processing target wafer W from the laser head 110 while rotating the chuck 100 (processing target wafer W) one round (360 degrees) at least, so that the annular internal modification layer M1 is formed. Then, the laser head 110 is relatively moved inwards in the diametrical direction of the processing target wafer W (Y-axis direction). By forming the internal modification layers M1 in the plane direction while repeating the formation of the annular internal modification layer M1 and the inward movement of the laser head 110 in the diametrical direction, the internal modification layers M1 as the buffer layer B are formed to be concentric with the bonding region Aa and the peripheral modification layer M2. Moreover, the buffer layer B is formed in a processing width (for example, 500 µm) equal to or larger than the eccentric amount of the bonding region Aa, for example.

Further, the diametrical interval Q of the internal modification layers M1 in the buffer layer B may be set as required.

Then, after the buffer layer B is formed, the internal modification layer M1 is formed in a spiral shape, starting from the inside of the processing width of the buffer layer B, for example. In addition, in the formation of this spiral-shaped internal modification layer M1, the above-mentioned eccentricity correction is not performed. In other words, in the second eccentricity correction method, the peripheral modification layer M2 and the internal modification layer M1 as the buffer layer B concentric with the peripheral modification layer M2 are formed while performing the eccentricity correction, whereas the eccentricity correction is not performed in the formation of the spiral-shaped internal modification layer M1 which is formed at the diametrically inner side than the buffer layer B.

As described above, according to the second eccentricity correction method, by forming, at the diametrically inner side than the peripheral modification layer M2, the buffer layer B with the processing width equal to or larger than the eccentric amount of the bonding region Aa, the eccentricity correction need not be performed in the formation of the spiral-shaped internal modification layer M1. That is, even if the internal modification layer M1 is formed eccentrically, since the eccentric amount is absorbed in the processing width of the buffer layer B, the internal modification layer M1 does not extend to the diametrically outer side than the peripheral modification layer M2. Furthermore, since there is no need to perform the eccentricity correction in the formation of the internal modification layers M1, the internal modification layers M1 can be formed more easily.

In addition, since the eccentricity correction need not be performed in the central portion of the processing target wafer W, a failure in performing the eccentricity correction appropriately as described above can be suppressed. Further, concerns for the occurrence of the resonance and the reduction of the guide lifetime can be reduced. Furthermore, since the eccentricity correction is not performed in the central portion as described above, the high rotation speed of the chuck 100 can be maintained, and as a result, the circumferential interval P of the internal modification layers M1 can be controlled constant.

Figure 27:
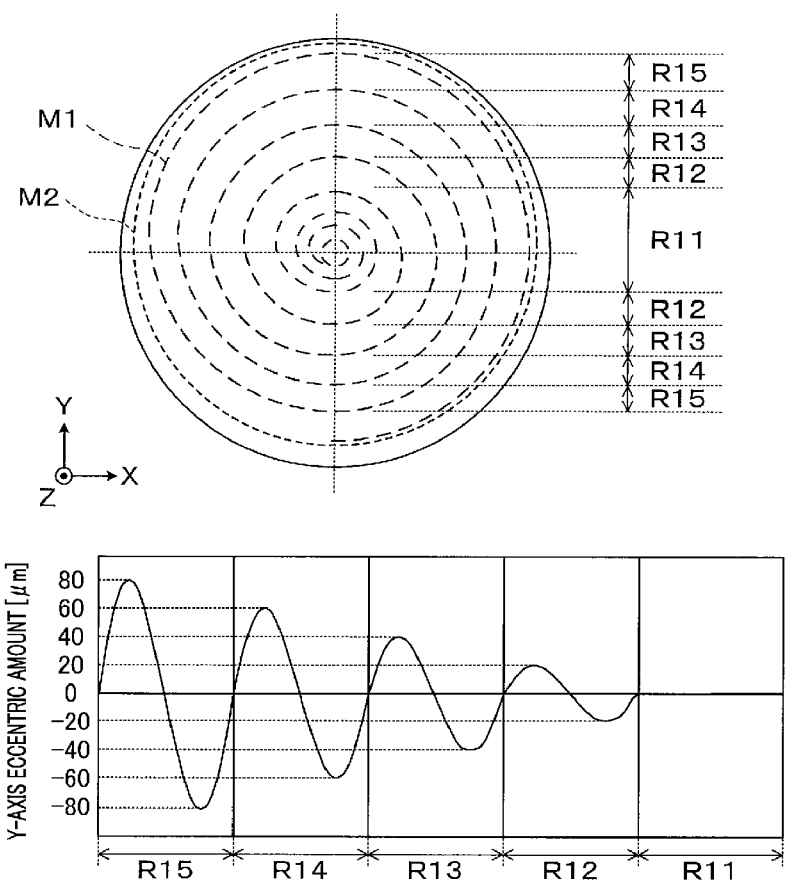
FIG. 27 is an explanatory diagram illustrating another method of forming internal modification layers in the processing target wafer.

FIG. 27 is an explanatory diagram showing a state of the modification layers formed within the processing target wafer W by a third eccentricity correction method.

In case that the non-bonding region Ab is formed eccentrically with respect to the processing target wafer W, the peripheral modification layer M2 is formed to be concentric with the bonding region Aa (non-bonding region Ab) in the process A1.

Then, in the third eccentricity correction method, at the diametrically inside of the peripheral modification layer M2 which is annularly formed to be concentric with the bonding region Aa (non-bonding region Ab) in the process A1, the eccentricity correction is performed in a range in which the laser head 110 is located at an outer periphery of the processing target wafer W. That is, while moving the laser head 110 from the diametrically outer side toward the diametrically inner side, the chuck 100 is rotated by the rotating mechanism 103 such that the center of the chuck 100 and the center of the bonding area Aa coincide with each other, and, also, the chuck 100 is moved in the Y-axis direction by the moving mechanism 104.

To elaborate, a formation range of the internal modification layers M1 in the processing target wafer W is divided into a plurality of regions along the diametrical direction, and an eccentric stroke is reduced gradually along these regions. FIG. 27 illustrates an example where the formation range of the internal modification layers M1 is divided into a central region R11 and four annular regions R12 to R15, and an eccentric amount of 100 µm is corrected by every 20 µm in each of the annular regions R12 to R15, that is, an example where the eccentric stroke is attenuated by 20 µm.

As described above, according to the third eccentricity correction method, by performing the eccentricity correction in the range included in the outer periphery of the processing target wafer W (the annular regions R12 to R15 in FIG. 27), it is not necessary to perform the eccentricity correction near the central portion of the processing target wafer W. That is, at the outer periphery of the processing target wafer W, the above-described eccentricity correction (attenuation of the eccentric stroke) is completed, so the eccentric amount is 0 µm. In the central portion (central region R11 in FIG. 27), the centers of the chuck 100 and the bonding region Aa coincide with each other. When forming the internal modification layers M1 as described above, the rotation speed of the chuck 100 is low when the laser head 110 is located at the outer periphery of the processing target wafer W. Therefore, the eccentricity correction can be appropriately carried out. As a result, the eccentric amount can be absorbed, and the internal modification layers M1 can be formed inside the peripheral modification layer M2.

Further, by removing the need to perform the eccentricity correction in the central region R11 of the processing target wafer W, the failure in properly performing the eccentricity correction as described above can be suppressed. Furthermore, the concerns for the occurrence of the resonance and the reduction of the guide lifetime can be reduced. Additionally, since the eccentricity correction is not performed in the central region R11 as described above, the high rotation speed of the chuck 100 can be maintained, and as a result, the circumferential interval P of the internal modification layers M1 can be controlled constant.

Moreover, the number of the annular regions for performing the eccentricity correction is not limited to the example of the present exemplary embodiment, and it can be selected as required. In addition, the eccentricity need not necessarily be corrected in a step manner for the annular regions as in the present exemplary embodiment. The eccentricity correction may be continuously performed from the outer periphery of the processing target wafer W toward the center thereof. As an example, the eccentricity correction may be performed for the time during which the laser head 110 radiates the laser light several rounds from the outer side of the processing target wafer W.

In addition, when correcting the eccentric amount at the outer periphery of the processing target wafer W by the third eccentricity correction method, it is desirable that the eccentricity correction is completed up to the half (r/2) of a radius of the processing target wafer W. That is to say, it is desirable that the radius of the central region R11 shown in FIG. 27 is equal to or larger than r/2.

The internal modification layers M1 in the process A1 is formed as described above. In this way, by performing the eccentricity correction in the formation of the internal modification layers M1, the edge trimming processing and the thinning processing can be performed easily. Therefore, it becomes easy to maintain the quality of the edge trimming processing and the thinning processing, and a control mechanism in these processings can be simplified.

In addition, even when the internal modification layers M1 are formed in the spiral shape as stated above, it is desirable to form the central modification layer M3 at the central portion of the processing target wafer W, leaving the aforementioned non-formation region of the internal modification layers M1.

Further, although the above exemplary embodiment has been described for the case where the processing target object is the circular plate-shaped processing target wafer W, the shape of the processing target object is not limited thereto. For example, a processing target wafer W having a square (rectangular) shape may be selected as the processing target object, as shown in FIG. 28A and FIG. 28B.

Figure 28A:
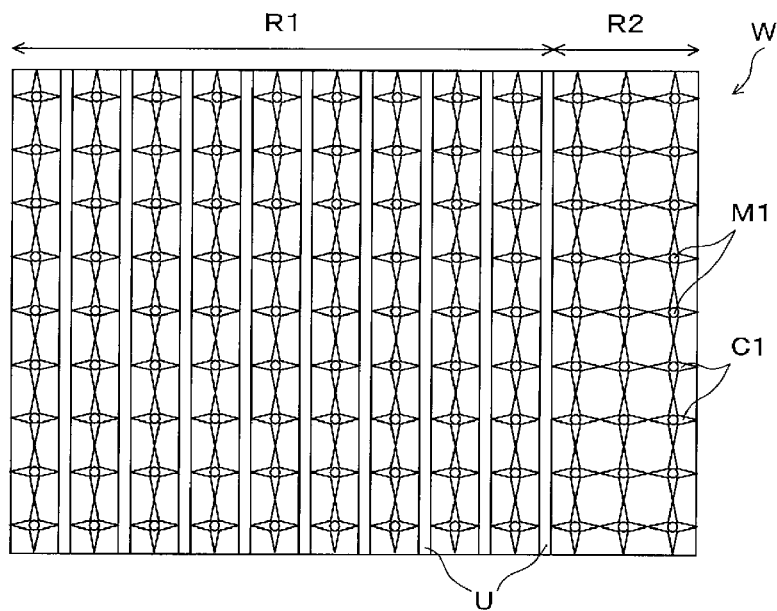
FIG. 28A and FIG. 28B are explanatory diagrams illustrating internal modification layers formed in another processing target wafer.
Figure 28B:
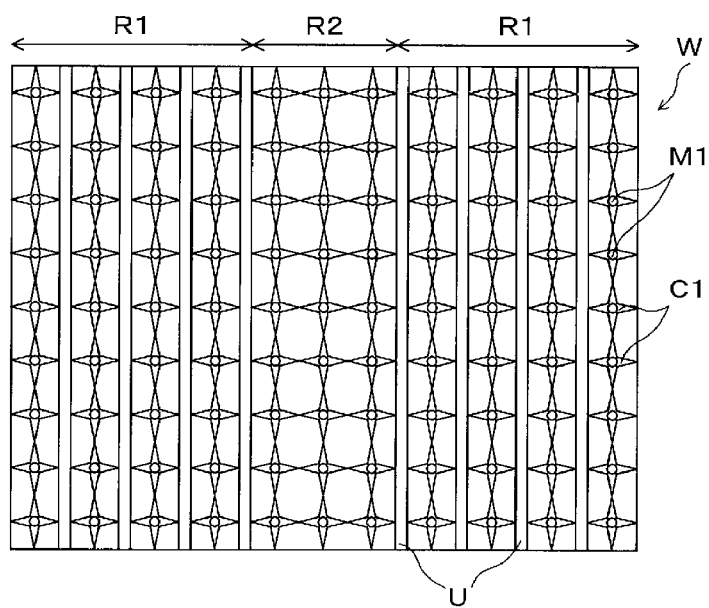

In such a case, the narrow-interval region R2 may be formed at one end of the processing target wafer W in a lengthwise direction thereof, as shown in FIG. 28A, or may be formed at a central portion of the processing target wafer W in the lengthwise direction thereof, as shown in FIG. 28B. Alternatively, the wide-interval region R1 and the narrow-interval region R2 may be alternately formed, or the wide-interval region R1 and the narrow-interval region R2 may be respectively formed along a short side of the processing target wafer W.

Further, in the above-described exemplary embodiment, the combined wafer T is formed by bonding the processing target wafer W to the support wafer S. However, a single processing target wafer W which is not bonded to the support wafer S may be used as the processing target object.

Furthermore, the above exemplary embodiment has been described for the example where the processing target wafer W as the processing target object is the silicon wafer. However, the type of the processing target object is not limited thereto. For example, instead of the silicon wafer, a glass substrate, a SiC substrate, a sapphire substrate, a monocrystalline substrate, a polycrystalline substrate, or an amorphous substrate may be selected as the processing target object. As another example, an ingot, a base, or a thin plate may be selected as the processing target object, instead of the substrate.

In addition, although the above exemplary embodiment has been described for the example where the processing target wafer W has the circular plate shape or the square (rectangular) shape, the shape of the processing target wafer W is not limited thereto, and it may have any of various shapes.

Further, the technique according to the present disclosure may be applied to manufacture a processing target wafer W having a device region in which a plurality of devices is formed on a surface thereof and an outer extra region surrounding this device region.

Additionally, the processing target wafer W may have an impurity layer between the device layer D and a condensing position of the laser light L2 for forming the internal modification layers M1. As the impurity layer, an impurity film (e.g., a Ti film) may be formed by sputtering a metal (e.g., Ti) as impurity on the surface of the processing target wafer W, or the impurity layer may be formed inside the processing target wafer W.

Figures 29A, 29B:
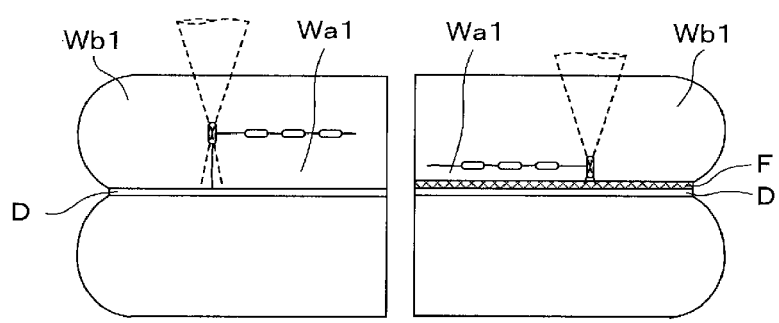
FIG. 29A and FIG. 29B are explanatory diagrams schematically illustrating another structure of the processing target wafer.

FIG. 29A and FIG. 29B are explanatory diagrams providing a comparison between a case (left side of the drawing) where an impurity layer F is not provided between the device layer D and the condensing position of the laser light L2 and a case (right side of the drawing) where the impurity layer F is provided.

A condensing height of the laser light L2 at the time of forming the internal modification layers M1 may be set to be a height which allows the device layer D not to be affected by the transmitted light of the laser light L2, or the like. This height is decided in advance through an experiment or the like.

Here, when the processing target wafer W has the impurity layer F inside, the impurity layer F can attenuate the laser light L2. As a result, as shown in FIG. 29B, the condensing height of the laser light L2 can be brought closer to the device layer D. That is, by increasing the thickness of the rear surface wafer Wb1, it is possible to make the thickness of the device wafer Wa1 close to a final target thickness in advance.

Accordingly, the grinding amount and the etching amount of the device wafer Wa1 after the detachment of the rear surface wafer Wb1 can be reduced, and the throughput can be improved. In addition, since the thickness of the rear surface wafer Wb1 as a wafer to be collected later can be increased, the range for the use of the collected wafer can be enlarged.

It should be noted that the above-described exemplary embodiment is illustrative in all aspects and is not anyway limiting. The above-described exemplary embodiment may be omitted, replaced and modified in various ways without departing from the scope and the spirit of claims.

According to the exemplary embodiment, it is possible to perform thinning of a processing target object appropriately.

We claim:

1. A processing apparatus configured to process a processing target object, comprising:
a modifying device configured to radiate laser light to an inside of the processing target object to form multiple modification layers along a plane direction; and
a controller and a storage including a program, wherein the storage and the program are configured, with the controller, to control an operation of the modifying device at least,
wherein the controller controls the modifying device to form, in the forming of the multiple modification layers, a first modification layer formation region in which cracks that develop from neighboring modification layers along the plane direction are not connected, and further controls the modifying device to form, in the forming of the multiple modification layers, a second modification layer formation region in which cracks that develop from neighboring modification layers along the plane direction are connected,
wherein in the forming of the multiple modification layers, the controller controls the modifying device to form, at a central portion of the processing target object when viewed from a top, a third modification layer formation region in which cracks that develop from neighboring modification layers along the plane direction are not connected, and
wherein the controller further controls the modifying device to form the first modification layer formation region and the second modification layer formation region at a diametrically outer side than the third modification layer formation region.

2. The processing apparatus of claim 1, wherein the controller controls the modifying device to form the first modification layer formation region before forming the second modification layer formation region.

3. The processing apparatus of claim 1, wherein the controller controls the modifying device to form the second modification layer formation region before forming the first modification layer formation region.

4. The processing apparatus of claim 1, wherein the controller controls the modifying device to form, between the first modification layer formation region and the second modification layer formation region of the processing target object when viewed from a top, a starting point modification layer serving as a starting point of separation of the processing target object.

5. The processing apparatus of claim 4, wherein the controller controls the modifying device to form the starting point modification layer after forming the first modification layer formation region and the second modification layer formation region.

6. The processing apparatus of claim 1, wherein a formation interval of the multiple modification layers in the first modification layer formation region is larger than 40 µm and smaller than 70 µm.

7. The processing apparatus of claim 1, wherein a formation interval of the multiple modification layers in the second modification layer formation region is larger than 10 µm and equal to or smaller than 40 µm.

8. The processing apparatus of claim 1, wherein an impurity layer configured to attenuate the laser light is formed within the processing target object.

9. The processing apparatus of claim 1, further comprising:
a rear surface film removing device configured to remove a rear surface film formed on an incident surface of the processing target object where the laser light arrives, before forming the multiple modification layers by the modifying device.

10. The processing apparatus of claim 1, wherein the controller controls the modifying device to anneal a separated surface of the processing target object after the processing target object is separated along the multiple modification layers as a starting point, or to remove a surface layer of the separated surface.

11. A processing apparatus configured to process a processing target object, comprising:
a modifying device configured to radiate laser light to an inside of the processing target object to form multiple modification layers along a plane direction; and
a controller and a storage including a program, wherein the storage and the program are configured, with the controller, to control an operation of the modifying device at least,
wherein the controller controls the modifying device to form, in the forming of the multiple modification layers, a first modification layer formation region in which cracks that develop from neighboring modification layers along the plane direction are not connected, and further controls the modifying device to form, in the forming of the multiple modification layers, a second modification layer formation region in which cracks that develop from neighboring modification layers along the plane direction are connected,
wherein the processing apparatus further comprises:
a holder configured to hold the processing target object;
a rotating mechanism configured to rotate the holder and the modifying device relatively; and
a moving mechanism configured to move the holder and the modifying device relatively in a horizontal direction, and
wherein in the forming of the first modification layer formation region and the second modification layer formation region, the controller controls the holder, the modifying device, the rotating mechanism and the moving mechanism to form the modification layer in an annular shape by radiating the laser light from the modifying device to the inside of the processing target object periodically while rotating one round the processing target object held by the holder relative to the modifying device by the rotating mechanism, to move the modifying device relative to the holder in a diametrical direction, and to form the multiple modification layers along the plane direction by repeating the forming of the modification layer and the moving of the modifying device in the diametrical direction.

12. A processing apparatus configured to process a processing target object, comprising:
a modifying device configured to radiate laser light to an inside of the processing target object to form multiple modification layers along a plane direction; and
a controller and a storage including a program, wherein the storage and the program are configured, with the controller, to control an operation of the modifying device at least,
wherein the controller controls the modifying device to form, in the forming of the multiple modification layers, a first modification layer formation region in which cracks that develop from neighboring modification layers along the plane direction are not connected, and further controls the modifying device to form, in the forming of the multiple modification layers, a second modification layer formation region in which cracks that develop from neighboring modification layers along the plane direction are connected,
wherein the processing apparatus further comprises:
a holder configured to hold the processing target object;
a rotating mechanism configured to rotate the holder and the modifying device relatively; and
a moving mechanism configured to move the holder and the modifying device relatively in a horizontal direction, and
wherein in the forming of the first modification layer formation region and the second modification layer formation region, the controller controls the holder, the modifying device, the rotating mechanism and the moving mechanism to form the multiple modification layers along the plane direction by radiating the laser light periodically from the modifying device to the inside of the processing target object while rotating the processing target object held by the holder relative to the modifying device by the rotating mechanism, and further by moving the modifying device relative to the holder in a diametrical direction by the moving mechanism.

13. The processing apparatus of claim 12,
wherein the controller controls the modifying device to form an annular buffer layer at an outer peripheral portion of the processing target object, and to form the first modification layer formation region and the second modification layer formation region at a diametrically inner side than the buffer layer.

14. The processing apparatus of claim 12,
wherein the controller controls the holder, the modifying device, the rotating mechanism and the moving mechanism to form the first modification layer formation region and the second modification layer formation region in a spiral shape, starting from a diametrically outer side of the processing target object, and to correct an eccentric amount between a rotation axis of the processing target object and a rotation axis of the holder in a step manner based on a relative position of the modifying device with respect to the holder in the diametrical direction.

15. The processing apparatus of claim 12,
wherein the controller stores therein delay times in starting and ending the radiation of the laser light to the processing target object from the modifying device, and
wherein the controller controls timings of starting and ending the radiation of the laser light by the modifying device based on the delay time and a rotation speed of the processing target object at a laser light radiation position of the modifying device.

16. A processing method of processing a processing target object, comprising:
forming multiple modification layers along a plane direction by radiating laser light from a modifying device to an inside of the processing target object;
forming a first modification layer formation region in which cracks that develop from neighboring modification layers along the plane direction are not connected;
forming a second modification layer formation region in which cracks that develop from neighboring modification layers along the plane direction are connected; and
forming, at a central portion of the processing target object when viewed from a top, a third modification layer formation region in which cracks that develop from neighboring modification layers along the plane direction are not connected,
wherein the first modification layer formation region and the second modification layer formation region are formed at a diametrically outer side than the third modification layer formation region.

17. The processing method of claim 16,
wherein the forming of the first modification layer formation region is performed before the forming of the second modification layer formation region.

18. The processing method of claim 16,
wherein the forming of the second modification layer formation region is performed before the forming of the first modification layer formation region.

19. The processing method of claim 16, further comprising:
forming, between the first modification layer formation region and the second modification layer formation region when viewed from a top, a starting point modification layer serving as a starting point of separation of the processing target object.

20. The processing method of claim 19,
wherein the forming of the starting point modification layer is performed after the forming of the first modification layer formation region and the forming of the second modification layer formation region.

21. The processing method of claim 16,
wherein a formation interval of the multiple modification layers in the first modification layer formation region is larger than 40 μm and smaller than 70 μm.

22. The processing method of claim 16,
wherein a formation interval of the multiple modification layers in the second modification layer formation region is larger than 10 μm and equal to or smaller than 40 μm.

23. The processing method of claim 16,
wherein the first modification layer formation region and the second modification layer formation region are formed in the processing target object in which an impurity layer is formed.

24. The processing method of claim 16, further comprising:
removing a rear surface film formed on an incident surface of the processing target object where the laser light arrives, before the forming of the multiple modification layers by the modifying device.

25. The processing method of claim 16, further comprising:
separating the processing target object along the multiple modification layers as a starting point; and
annealing a separated surface of the processing target object after the processing target object is separated, or removing a surface layer of the separated surface.

26. The processing method of claim 16,
wherein a stress is accumulated within the processing target object by the forming of the first modification formation region,
wherein the stress is released into the first modification layer formation region,
wherein the processing target object is separated by the release of the stress, and
wherein cracks that develop from neighboring modification layers in the plane direction in the first modification layer formation region are connected by the separation.

27. A processing method of processing a processing target object, comprising:
forming multiple modification layers along a plane direction by radiating laser light from a modifying device to an inside of the processing target object;
forming a first modification layer formation region in which cracks that develop from neighboring modification layers along the plane direction are not connected; and
forming a second modification layer formation region in which cracks that develop from neighboring modification layers along the plane direction are connected,
wherein in the forming of the first modification layer formation region and in the forming of the second modification layer formation region, and
wherein the multiple modification layers are formed along the plane direction by radiating the laser light periodically from the modifying device to the inside of the processing target object while rotating the processing target object held by the holder relative to the modifying device, and by moving the modifying device relative to the holder in a diametrical direction.

28. The processing method of claim 27, further comprising:
forming an annular buffer layer at an outer peripheral portion of the processing target object, wherein the first modification layer formation region and the second modification layer formation region are formed at a diametrically inner side than the buffer layer.

29. The processing method of claim 27,
wherein the first modification layer formation region and the second modification layer formation region are formed in a spiral shape, starting from a diametrically outer side of the processing target object, and
wherein an eccentric amount between a rotation axis of the processing target object and a central axis of the modification layer in the spiral shape is corrected in a step manner based on a relative position of the modifying device with respect to the holder in the diametrical direction.

30. The processing method of claim 27,
wherein a timing for a start and an end of the radiation of the laser light by the modifying device is controlled based on a rotation speed of the processing target object at a laser light radiation position of the modifying device and delay times in starting and ending the radiation of the laser light to the processing target object from the modifying device.

31. A processing method of processing a processing target object, comprising:

forming multiple modification layers along a plane direction by radiating laser light from a modifying device to an inside of the processing target object;

forming a first modification layer formation region in which cracks that develop from neighboring modification layers along the plane direction are not connected; and forming a second modification layer formation region in which cracks that develop from neighboring modification layers along the plane direction are connected, wherein in the forming of the first modification layer formation region and in the forming of the second modification layer formation region, wherein the modification layer is formed in an annular shape by radiating the laser light from the modifying device to the inside of the processing target object periodically while rotating one round the processing target object held by the holder relative to the modifying device, wherein the modifying device is then moved relative to the holder in a diametrical direction, and wherein the multiple modification layers are formed along the plane direction by repeating the forming of the modification layer and the moving of the modifying device in the diametrical direction.

* * * * *